(12) United States Patent
Nakayama et al.

(10) Patent No.: US 7,601,423 B2
(45) Date of Patent: Oct. 13, 2009

(54) ETHYLENE-BASED POLYMER MICROPARTICLES, FUNCTIONAL GROUP-CONTAINING ETHYLENE-BASED POLYMER MICROPARTICLES, AND CATALYST CARRIERS FOR MANUFACTURE THEREOF

(75) Inventors: Yasushi Nakayama, Ichihara (JP); Naoto Matsukawa, Ichihara (JP); Junji Saito, Chiba (JP); Hideki Bando, Ichihara (JP); Yoshiho Sonobe, Yokohama (JP); Kenji Michiue, Ichihara (JP); Makoto Mitani, Yokohama (JP); Terunori Fujita, Yokohama (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 58 days.

(21) Appl. No.: 11/791,104

(22) PCT Filed: Nov. 18, 2005

(86) PCT No.: PCT/JP2005/021245

§ 371 (c)(1),
(2), (4) Date: May 18, 2007

(87) PCT Pub. No.: WO2006/054696

PCT Pub. Date: May 26, 2006

(65) Prior Publication Data
US 2008/0044655 A1 Feb. 21, 2008

(30) Foreign Application Priority Data

| Nov. 19, 2004 | (JP) | ............................. 2004-336325 |
| Nov. 19, 2004 | (JP) | ............................. 2004-336326 |
| Jan. 28, 2005 | (JP) | ............................. 2005-021600 |
| Jan. 28, 2005 | (JP) | ............................. 2005-021601 |
| Jan. 28, 2005 | (JP) | ............................. 2005-021604 |
| Feb. 8, 2005 | (JP) | ............................. 2005-032222 |

(51) Int. Cl.
*C08F 4/10* (2006.01)
*C08F 4/16* (2006.01)
*C08F 4/12* (2006.01)

(52) U.S. Cl. .................. 428/402; 428/523; 526/90; 526/102; 526/123.1

(58) Field of Classification Search .................. 428/402, 428/403, 523; 523/90, 102, 123.1
See application file for complete search history.

(56) References Cited

U.S. PATENT DOCUMENTS 4,210,738 A * 7/1980 Hermans et al. ............ 526/152
4,499,194 A 2/1985 Harada et al.
4,972,035 A * 11/1990 Suga et al. ................ 526/125.6
5,194,531 A * 3/1993 Toda et al. ................ 526/125.3
5,292,584 A * 3/1994 Howard et al. .............. 428/327
5,780,379 A * 7/1998 Fiasse ........................ 502/132
5,879,757 A 3/1999 Gutowski et al.
6,368,708 B1 * 4/2002 Brown et al. .......... 428/355 RA
6,897,176 B2 * 5/2005 Nakayama et al. .......... 502/155
7,091,291 B1 * 8/2006 Nagy ......................... 526/161
7,199,202 B2 * 4/2007 Minami et al. .............. 526/351
7,208,559 B2 * 4/2007 Satoh et al. ............... 526/348.6
2004/0266609 A1 12/2004 Tanase et al.
2006/0105907 A1 5/2006 Tanase et al.

FOREIGN PATENT DOCUMENTS

| EP | 0159110 B1 | 5/1990 |
| EP | 1 449 854 A | 8/2004 |
| JP | 59-133209 A | 7/1984 |
| JP | 60-163935 A | 8/1985 |
| JP | 05-202130 A | 8/1993 |
| JP | 05-301921 A | 11/1993 |
| JP | 05-320244 A | 12/1993 |
| JP | 05-331295 A | 12/1993 |
| JP | 07-041514 A | 2/1995 |
| JP | 09-508157 A | 8/1997 |
| JP | 11-315109 A | 11/1999 |
| JP | 2004-143404 A | 5/2004 |

OTHER PUBLICATIONS

"Conspectus of Coating Techniques in Plastics", Industrial Technique Service Center, 1989, pp. 251-293 (partial translation attached)*.

* cited by examiner

*Primary Examiner*—H. (Holly) T Le
(74) *Attorney, Agent, or Firm*—Buchanan Ingersoll & Rooney PC

(57) ABSTRACT

Ethylene-based copolymer microparticles and functional group-containing ethylene-based copolymer microparticles that have particle diameter smaller than that of conventional polyethylene fine-particles, no inter-particle agglomeration, very narrow particle size distribution, and high sphericity are provided, in which requirements (A) to (E): (A) The intrinsic viscosity [η] measured in decalin at 135° C. is in the range of 0.1 to 50 dl/g, (B) at least 95 wt % or more of particles pass through a mesh screen with an opening of 37 μm, (C) the median diameter ($d_{50}$) measured by laser diffraction scattering is 3 μm$\leq d_{50} \leq$25 μm, (D) the circularity coefficient is 0.85 or more, and (E) the variation coefficient of particle diameter (Cv) is 20% or less. Non-agglomerated spherical magnesium-containing microparticles used as magnesium-containing carrier component for olefin-polymerization catalysts that can manufacture the above microparticles are also provided.

6 Claims, 2 Drawing Sheets

ETHYLENE-BASED POLYMER MICROPARTICLES, FUNCTIONAL GROUP-CONTAINING ETHYLENE-BASED POLYMER MICROPARTICLES, AND CATALYST CARRIERS FOR MANUFACTURE THEREOF

TECHNICAL FIELD

The present invention relates to ethylene-based polymer microparticles and functional group-containing ethylene-based polymer microparticles suitable for various uses as high-performance materials. In more detail, it relates to ethylene-based polymer microparticles and functional group-containing ethylene-based polymer microparticles in which the particle diameter is smaller than those of conventional polyethylene fine-particles, microparticles do not agglomerate each other, the particle size distribution is extremely narrow, and the sphericity is high.

Moreover, the present invention relates to non-agglomerated, spherical, magnesium-containing microparticles, and in more detail to non-agglomerated, spherical, magnesium-containing microparticles used as a career component for catalyst for manufacturing the ethylene-based polymer microparticles and the functional group-containing ethylene-based polymer microparticles that have extremely small particle diameters, are free from inter-particle agglomeration, and have very narrow particle size distribution.

BACKGROUND ART

In recent years, polymer microparticles are actively developed and widely used for various industrial applications. In particular, spherical polymer microparticles with narrow particle size distribution are applied to uses in filters, separation membranes, dispersants, powder coating, resin modifiers, coating agents, and the like, owing to their excellence in processability, fluidity, and surface properties. Although these polymer particles are made of various materials such as acrylic resin, styrene resin, melamine resin, and polyolefin, resin microparticles based on polyolefin, especially polyethylene, attract attention due to the advantages of high crystallinity, high melting temperature, and increased chemical stability. Using polyethylene-based microparticles, various new materials and new applications have been proposed and put into practical use, making use of their features such as water resistance, oil resistance, chemical resistance, and biological safety, which are not attained with other materials.

For example, polyethylene-based microparticles, non-treated or with treatment such as surface modification, can be used as filler of columns for separating chemical or biological substances with high efficiency, adsorbents or catalyst carriers with high specific surface area, and others. Moreover, they are utilized as carriers with function of delivery and sustained release of drugs, dispersing aid for homogeneously dispersing fine-particulate substances with low dispersibility, or highly safe particulate materials with good touch effect to skin in cosmetics.

In addition, polyethylene-based microparticles are actively investigated for applying to novel functional materials such as materials for separators in lithium batteries or lithium ion secondary batteries, materials for optical filters with functions of diffusion, reflection, or inhibition of reflection of light, high-performance binders of sintered porous materials such as ceramics, pore-forming materials in breathable films, carriers for immobilizing immunochemically active substances, microporous sintered filters with high specific surface area, skidding aids, toner, delusterants for paint, light diffusive additives, insulating fillers, nucleating agents for crystallization, fillers for chromatography, and carriers for immunodiagnostic agents.

Commonly to these uses as novel high-performance materials, for further functionalization and improvement in performances and quality, there is a demand for polyethylene-based spherical ultra-fine particles with smaller particle diameter and narrower particle size distribution free from inter-particle agglomeration.

On the other hand, currently known processes for manufacturing polyethylene-based microparticles are roughly classified into the following four techniques, i.e., (1) mechanical grinding (pulverization at room temperature or in frozen state, wet grinding, jet grinding), (2) spraying (dry, coagulation), (3) forced emulsification (melt emulsification, solution emulsification), and (4) suspension polymerization.

The mechanical grinding is a method of applying pulverization energy such as impulse force and shear force directly to bulk polymer to pulverize. The shape of microparticles obtained by this method generally tends to be indeterminate form, and therefore polyethylene-based microparticles with narrow particle size distribution are hardly obtained.

The spraying is a method of spraying a liquefied substance such as polymer solution made by dissolving bulk polyethylene in a solvent or melted polymer from a nozzle, followed by solidifying by drying/cooling to provide polymer microparticles. The polyethylene-based microparticles obtained by this method are formed as highly spherical microparticles due to surface tension of the liquefied substance sprayed, though they are often obtained in an agglomerated form of some particles and generally have widely distributed particle size. Moreover, depending on the molecular weight of polyethylene-based resin, the polymer solution may have high viscosity and cannot be sprayed in a particulate form because of stringiness or other adverse events on spraying. Therefore, it is hard to apply the spraying to high-molecular-weight polyethylene-based resin.

Meanwhile, the emulsification is a method of forcedly emulsifying polyethylene-based resin at temperatures not lower than its melting point in the presence of an emulsifier or dispersant in aqueous medium. This method has an advantage that, because of applied shear force to melted polymer in aqueous medium, the resultant polyethylene-based particles are more spherical and less agglomerated compared with the above two microparticle-forming methods. However, even with this method, as the molecular weight of polyethylene-based resin increases, it becomes more difficult to maintain narrow particle size distribution; thus it cannot be applied to polyethylene with ultra-high molecular weight. Moreover, this method is accompanied by problems such as remaining of the used emulsifier in the microparticles, and hence its use is restricted in some case.

The above microparticle-forming methods, because of using bulk polyethylene as a starting material, require two steps of processes: manufacturing polyethylene with an olefin-polymerization catalyst, by high-pressure radical polymerization, or otherwise; and forming microparticles therefrom. On the other hand, in forming microparticles by suspension polymerization, polyethylene-based microparticles can be directly obtained from ethylene monomer by polymerization using a solid olefin-polymerization catalyst formed into microparticles with controlled shape. In this method, so-called replica effect works, i.e., the particle shape and size distribution of solid olefin-polymerization catalyst are directly reflected in the particle shape and size distribution of resultant polyethylene-based microparticles; therefore, it is predicted that if the particles of solid olefin-polymerization catalyst used in polymerization are agglomerated, only polyethylene-based microparticles likewise agglomerated should be obtained.

Therefore, in order to obtain non-agglomerated, spherical polyethylene-based microparticles with narrow particle size distribution, a solid olefin-polymerization catalyst formed into microparticles with controlled shape is indispensable. A variety of such catalysts and synthetic methods thereof have been disclosed. For example, Japanese Patent Laid-Open Publication No. H05-320244 discloses a solid catalytic component obtained by contacting magnesium halide, tetraalkoxytitanium, aluminum halide, and an ether compound in a specific manner; and a method for manufacturing polyethylene using said solid catalyst. This document describes that the resultant polyethylene has very narrow particle size distribution, excellent flowability and bulk density. However, the polyethylene obtained has a diameter of 100 μm or greater and contains a slight amount of coarse particles sized 600 μm or greater, and hence it is substantially hard to regard as ultra-fine particles and unsatisfactory in the above uses as novel high-performance materials.

Japanese Patent Laid-Open Publication No. H05-301921 discloses a solid catalyst component synthesized by a specific contact method using diethoxymagnesium, tetrabutoxytitanium, tetrachlorosilane, aromatic dicarboxylic acid diester, and tetrachlorotitanium as raw materials. Japanese Patent Laid-Open Publication No. H07-41514 discloses a solid catalyst component synthesized by specific method using diethoxymagnesium, tetraisopropoxytitanium or tetrakis(2-ethylhexoxy)titanium, tetrachlorosilane, sorbitan fatty acid ester, tetrachlorotitanium, and an aromatic dicarboxylic acid diester as raw materials; and polyethylene manufactured by polymerization of ethylene using that solid catalyst component. It is described that these polyethylenes have narrow particle size distribution and high sphericity. However, the particle diameter of polyethylene is still 100 μm or more, which is unsatisfactory as ultra-fine particles desired to be sized tens of micrometers. Judging from the nominal particle diameter of solid catalyst, it is estimated that manufacturing ultra-fine polyethylene particles is substantially difficult.

In Japanese Patent Laid-Open Publication No. S60-163935, EP 0159110-B, and U.S. Pat. No. 4,972,035, it is disclosed that polyethylene microparticles with controlled particle diameter and particle size distribution can be manufactured by high-speed shearing of polyethylene particles obtained in polymerizing ethylene under specific conditions in the presence of a specific Ziegler-type catalyst, or by polymerization of ethylene with a specific fine-dispersed Ziegler catalyst that has been sheared at high speed. It is described that those polyethylenes are tens of micrometers in particle diameter, contain substantially no coarse particles, and have narrow particle size distribution. However, those materials contain a large amount of polyethylene particles agglomerated each other, and the particle shape is not spherical but rather confetto-like. For this reason, it is supposed that these materials should be poor in performances such as flowability, dispersibility, and packing characteristics as powder, and thus they are not sufficiently compatible with the above uses as novel high-performance materials. The interaction between agglomerated particles is partly based on strong chemical bonds, and hence it seems impossible to completely dissociate into non-agglomerated state by the high-speed shearing described in these publications or other mechanical cracking processes. Furthermore, in an attempt to obtain polyethylene microparticles with a smaller particle diameter, the cohesiveness between resultant polyethylene particles tends to increase, so that it is supposed that non-agglomerated ultra-fine particles, for example, with a particle diameter of around 10 μm are substantially impossible to manufacture.

According to the disclosure in Japanese Patent Laid-Open Publication No. 2004-143404, when a mixture of polyolefin-based resin and a fluid that does not dissolve that polyolefin-based resin at a normal temperature and pressure is heated and/or pressurized to make that fluid into super-critical or sub-critical state, followed by rapid cooling or pressure release of that fluid, spherical particles with a particle diameter of 1 μm or less are obtained.

However, this method required two steps of processes, manufacturing polyolefin particles and forming into microparticles, and because of the extremely small particle diameter, these particles have difficulty in handling on forming and impose problems relating to environmental pollution in the manufacturing processes or the safety in working environment.

For further functionalization and improvement in performances and quality, the microparticles of polyethylene-based resin are desired to have a smaller particle diameter and narrower particle size distribution and to be free from inter-particle agglomeration; it is, therefore, longed for the advent of a component of olefin-polymerization catalyst that enables manufacturing such spherical polyethylene-based microparticles, i.e., a magnesium-containing carrier serving as a carrier for the catalyst.

In some uses, polyethylene-based microparticles, after formed into a filter, a film or the like, are treated for surface functionalization by methods such as treatment with an oxidizing strong acid, plasma exposure, electron beam irradiation, laser irradiation, and UV exposure. Examples of these methods are disclosed in "Conspectus of Coating Technique in Plastics" (Industrial Technique Service Center, P. 251 (1989)).

Nevertheless, there has been no polyethylene-based microparticles material with uniform particle diameter and size having functional groups on the surfaces, and its discovery is awaited as a novel material.

[Patent Document 1] Japanese Patent Laid-Open Publication No. H5-320244
[Patent Document 2] Japanese Patent Laid-Open Publication No. H5-301921
[Patent Document 3] Japanese Patent Laid-Open Publication No. H7-41514
[Patent Document 4] Japanese Patent Laid-Open Publication No. S60-163935
[Patent Document 5] EP 0159110-B
[Patent Document 6] U.S. Pat. No. 4,972,035
[Patent Document 7] Japanese Patent Laid-Open Publication No. 2004-143404
[Non-patent Document 1] "Conspectus of Coating Techniques in Plastics" (Industrial Technique Service Center, p. 251 (1989))

DISCLOSURE OF THE INVENTION

Problems to be Solved by the Invention

As described in Background Art, any conventional polyethylene-based fine-particles do not meet every requirement for the present invention, and hence are not enough satisfying. The present invention has been made in view of the above technological backgrounds and has a major object to provide ethylene-based polymer microparticles and functional group-containing ethylene-based polymer microparticles that have particle diameter smaller than those of conventional polyethylene fine-particles and extremely narrow particle size distribution, are free from inter-particle agglomeration, have high sphericity, and can be used suitably for various uses as high-performance materials.

Furthermore, the present invention also has another object to provide non-agglomerated spherical magnesium-containing microparticles usable as a magnesium-containing carrier component for olefin-polymerization catalysts that enables manufacturing the above ethylene-based polymer microparticles and functional group-containing ethylene-based polymer microparticles.

Means for Solving the Problems

The first embodiment of the present invention provides ethylene-based polymer microparticles of which (A) the intrinsic viscosity [η] measured in decalin at 135° C. is in the range of 0.1 to 50 dl/g, (B) at least 95 wt % or more of particles pass through a mesh screen with an opening of 37 μm, (C) the median diameter ($d_{50}$) measured by laser diffraction scattering is 3 μm≦$d_{50}$≦25 μm, (D) the circularity coefficient is 0.85 or more, and (E) the variation coefficient (Cv) of particle diameter is 20% or less.

The second embodiment of the present invention provides functional group-containing ethylene-based polymer microparticles having one or more functional groups selected from vinyl group, vinylene group, vinylidene group, oxygen-containing group, nitrogen-containing group, boron-containing group, sulfur-containing group, phosphorus-containing group, silicon-containing group, germanium-containing group, halogen-containing group, and tin-containing group, of which (B) at least 95 wt % or more of particles pass through a mesh screen with an opening of 37 μm, (C) the median diameter ($d_{50}$) measured by laser diffraction scattering is 3 μm≦$d_{50}$≦25 μm, (E) the variation coefficient (Cv) of particle diameter is 20% or less, and (F) the infrared absorption spectrum after treatment with methanol is substantially the same as the infrared absorption spectrum before treatment with methanol.

The third embodiment of the present invention provides the functional group-containing ethylene-based polymer microparticles of the second embodiment wherein the number of functional groups is 0.01 to 20 per 1000 carbon atoms in the constitutional particles.

The fourth embodiment of the present invention provides the functional group-containing ethylene-based polymer microparticles of the second or third embodiment comprising 90 to 100 mol % of constitutional unit derived from ethylene and 0 to 10 mol % of constitutional unit derived from one or more monomers selected from linear or branched α-olefins having 3 to 6 carbon atoms, cycloolefins, polar group-containing olefins, dienes, trienes, and aromatic vinyl compounds.

The fifth embodiment of the present invention provides a molded article formed from the ethylene-based polymer microparticles or functional group-containing ethylene-based polymer microparticles provided as the first to fourth embodiments.

The sixth embodiment of the present invention provides a sintered body formed from the ethylene-based polymer microparticles or functional group-containing ethylene-based polymer microparticles provided as the first to fourth embodiments.

The seventh embodiment of the present invention provides non-agglomerated spherical magnesium-containing microparticles that contain magnesium atom, aluminum atom, and alkoxy group having 1 to 20 carbon atoms, are insoluble in hydrocarbon solvents, and have a median diameter ($d_{50}$) measured by laser diffraction scattering of 0.1 μm≦$d_{50}$≦5 μm and a variation coefficient (Cv) of particle diameter of 20% or less.

The eighth embodiment of the present invention provides the non-agglomerated spherical magnesium-containing microparticles of the seventh embodiment serving as a carrier component for olefin-polymerization catalysts.

EFFECT OF THE INVENTION

The ethylene-based polymer microparticles according to the present invention have small particle diameter, no inter-particle agglomeration, narrow particle size distribution, and high sphericity; therefore, they are useful in various uses as novel high-performance materials.

Moreover, the functional group-containing ethylene-based polymer microparticles according to the present invention have adherence, hydrophilicity, lipophilicity, water repellency, oil repellency, flowability, and dye-affinity, which are not attained in conventional materials, depending on the functional group introduced; therefore, their application can be developed to various high-performance new materials.

Furthermore, the non-agglomerated spherical magnesium-containing microparticles according to the present invention, when used as a carrier component for olefin-polymerization catalysts, enable manufacturing the above ethylene-based polymer microparticles or functional group-containing ethylene-based polymer microparticles that have a particle diameter smaller than those of conventional polyethylene-based fine-particles, no inter-particle agglomeration, and narrow particle size distribution.

BEST MODE FOR CARRYING OUT THE INVENTION

Figure 1:
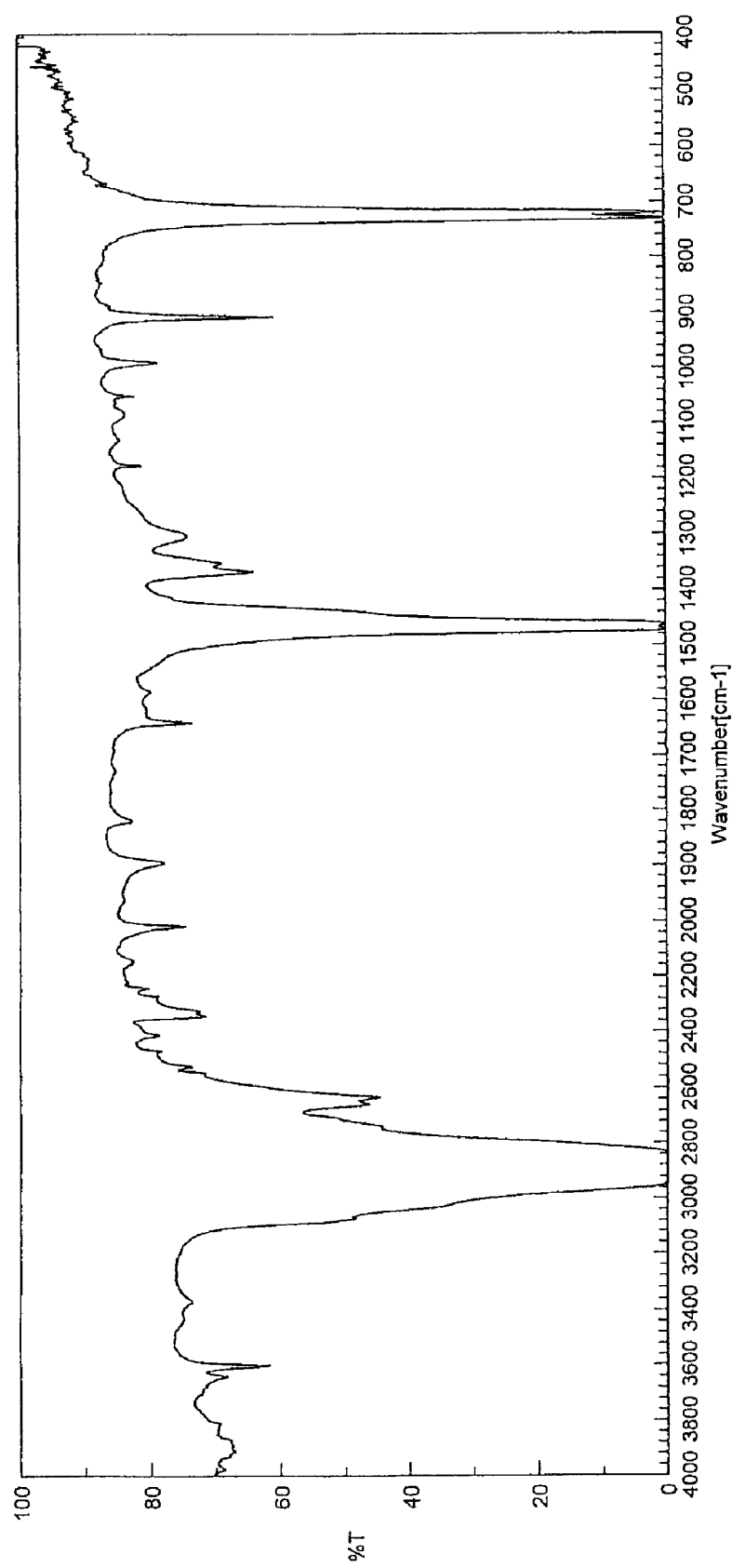
FIG. 1 is IR chart of the vinyl group-containing ethylene-based polymer microparticles obtained in Example 2.

Hereafter, the ethylene-based polymer microparticles and magnesium-containing microparticles according to the present invention are specifically explained.

[Ethylene-based Polymer Microparticles]

The ethylene-based polymer microparticles of the present invention have characteristics that (A) the intrinsic viscosity [η] measured in decalin at 135° C. is in the range of 0.1 to 50 dl/g, (B) at least 95 wt % or more of particles pass through a mesh screen having an opening of 37 μm, (C) the median diameter ($d_{50}$) measured by laser diffraction scattering is 3 μm≦$d_{50}$≦25 μm, (D) the circularity coefficient is 0.85 or more, and (E) the variation coefficient (Cv) of particle diameter is 20% or less. The followings are description on the methods for determining the particle properties specified in each requirement and the method for manufacturing the microparticles.

Intrinsic Viscosity [η]

The intrinsic viscosity [η] in the present invention is the value measured at 135° C. using decalin as solvent. That is, about 20 mg of granulated pellet is dissolved in 15 ml of decalin and the specific viscosity $\eta_{SP}$ is measured in an oil bath at 135° C.; after the decalin solution is diluted by adding 5 ml of decalin, and the specific viscosity $\eta_{SP}$ is similarly measured; this dilution operation is repeated two more times; and the extrapolated value of $\eta_{SP}/C$ at the concentration (C) approaching 0 is obtained as the intrinsic viscosity.

$$[\eta]=lim(\eta_{SP}/C), (C \rightarrow 0)$$

The ethylene-based polymer microparticles of the present invention require that the intrinsic viscosity [η] should be in the range of 0.1 to 50 dl/g, preferably 0.15 to 50 dl/g, and more preferably 0.2 to 50 dl/g. When the intrinsic viscosity [η] of ethylene-based polymer microparticles is higher than 0.1 dl/g, there is no possibility of partial melting of the polymer particles by heat generation during polymerization or partial dissolution of the resultant polymer into the polymerization solvent in slurry polymerization. Thus, it is considered that the particle shape of polymer will not disintegrate and that polymer particles will not agglomerate each other.

Moreover, when the intrinsic viscosity [η] is 6 dl/g or more, or preferably 10 dl/g or more, the microparticles are excellent in abrasion resistance, impact resistance, and self-lubricity.

Fraction of Particles Passing Through a Mesh Screen having an Opening of 37 μm

When the ethylene-based polymer microparticles of the present invention are classified using a vibrating sieve or an ultrasonic vibration sieve, the fraction of particles passing through a mesh screen having an opening of 37 μm (Tyler #400) is not less than 95 wt %, more preferably not less than 98 wt %, furthermore preferably not less than 99.7%, and most preferably 100%. Namely, when 95 wt % or more of the ethylene-based polymer microparticles passes, it means that the amount of coarse particles present therein is low. In such polymer particles, the closest packing, which is ideal packing as powder, is not inhibited by lowered flowability or dispersibility due to existence of coarse particles, and therefore, they are sufficiently satisfactory in the above uses as novel high-performance materials.

Median Diameter ($d_{50}$) and Variation Coefficient (Cv)

The median diameter ($d_{50}$) and variation coefficient (Cv) referred to in the present invention are measured by laser diffraction scattering.

The median diameter ($d_{50}$) of the ethylene-based polymer microparticles of the present invention is 3 μm≦$d_{50}$≦25 μm, and preferably 3 μm≦$d_{50}$≦10 μm.

When the average particle diameter of ethylene-based polymer microparticles is 3 μm or more, they can be relatively easily handled in forming and hardly pollute surrounding environment with microparticles. Therefore, when used in manufacturing processes of various precision equipments, sanitary goods, or the like, inferior quality by environmental pollution can be still easily controlled.

Such microparticles are also excellent in securing safety in working environment, since they are less likely to adhere to clothes or others or to be inhaled by the human body. Furthermore, in compression molding for making sintered filters or others, since they are also relatively easily handled and well packed in mold, filters with a uniform pore size can be efficiently obtained.

When the average particle diameter is 25 μm or less, especially 10 μm or less, the particles can be suitably used as filler of columns for efficiently separating chemical or biological substances, adsorbents, and catalyst carriers because of large specific surface area per unit weight of particles. Since the properties of ethylene-based polymer microparticles affect the physical properties of formed bodies, microparticles with the above properties can provide filters with small pore sizes when used as materials for sintered filters, and also provide good touch effect to the skin when used as cosmetic materials.

While polyethylene microparticles synthesized by usual suspension polymerization have a Cv value of 30% or more, in the present invention, any material with a Cv value over 20% is beyond scope, and the Cv value is preferably 18% or less, and more preferably 15% or less.

The Cv value of microparticles can be measured by a wet method with a laser diffraction scattering instrument (LS-13320 by Beckman Coulter, Inc.).

The Cv value is calculated by equation (1) below:

$$Cv(\%)=(\sigma_D/Dn)\times 100 \quad (1)$$

(in equation (1), $\sigma_D$ is standard deviation of particle diameter and Dn is weight-average particle diameter).

Circularity Coefficient

The ethylene-based polymer microparticles of the present invention are microparticles with high sphericity, i.e. quite small geometrical deviation from sphere. This property can be estimated by measuring the circularity coefficient. When the circularity coefficient is closer to one (1), the particles have projected shape closer to perfect circle, i.e. have shape closer to sphere.

The circularity coefficient is defined as 4η×(projected area of particles)/(projected circumference of particles)$^2$ and can be measured by capturing a two-dimensional image on a Digital High Definition Microscope VH-7000 by Keyence Corp., followed by analyzing the image with Mac-View version 3.5 by Mountech Co., Ltd.

The circularity coefficient is 0.85 or more, preferably 0.88 or more, and more preferably 0.90 or more.

Spherical microparticles with a circularity coefficient of 0.85 or more can provide, for example, when used as materials for sintered filters, filters with uniform pore size; and when used as spacer for providing gaps of liquid crystal boards, they can provide very high-precision gaps.

The constituents of ethylene-based polymer microparticles in the present invention comprises 90 to 100 mol % of constitutional unit derived from ethylene and 0 to 10 mol % of constitutional unit derived from one or more monomers selected from linear or branched α-olefins having 3 to 6 carbon atoms, cycloolefins, polar group-containing olefins, dienes, trienes, and aromatic vinyl compounds. The linear or branched α-olefins having 3 to 6 carbon atoms include propylene, 1-butene, 1-pentene, 3-methyl-1-butene, 1-hexene, 4-methyl-1-pentene, and 3-methyl-1-pentene, of which propylene, 1-butene, 1-hexene, and 4-methyl-1-pentene are preferred.

The cycloolefins include, cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; the polar group-containing olefins include α,β-unsaturated carboxylic acids such as acrylic acid, methacrylic acid, fumaric acid, maleic anhydride, itaconic acid, itaconic anhydride, and bicyclo[2.2.1]-5-heptene-2,3-dicarboxylic anhydride; metal salts of α,β-unsaturated carboxylic acid such as sodium, potassium, lithium, zinc, magnesium, or calcium salt of said acid; α,β-unsaturated carboxylic esters such as methyl acrylate, ethyl acrylate, n-propyl acrylate, isopropyl acrylate, n-butyl acrylate, isobutyl acrylate, tert-butyl acrylate, 2-ethylhexyl acrylate, methyl methacrylate, ethyl methacrylate, n-propyl methacrylate, isopropyl methacrylate, n-butyl methacrylate, and isobutyl methacrylate; vinyl esters such as vinyl acetate, vinyl propionate, vinyl caproate, vinyl caprate, vinyl laurate, vinyl stearate, and vinyl trifluoroacetate; unsaturated glycidyl compounds such as glycidyl acrylate, glycidyl methacrylate, and monoglycidyl itaconate; and others. The dienes or trienes include, butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinylnorbornene, dicyclopentadiene, 7-methyl-1,6-octadiene, 4-ethylidene-8-methyl-1,7-nonadiene, and 5,9-dimethyl-1,4,8-decatriene.

The aromatic vinyl compounds include; mono- or poly-alkylstyrenes such as styrene, o-methylstyrene, m-methylstyrene, p-methylstyrene, o,p-dimethylstyrene, o-ethylstyrene, m-ethylstyrene, and p-ethylstyrene; functional group-containing styrene derivatives such as methoxystyrene, ethoxystyrene, vinylbenzoic acid, methyl vinylbenzoate, vinylbenzyl acetate, hydroxystyrene, o-chlorostyrene, p-chlorostyrene, and divinylbenzene; 3-phenylpropylene, α-methylstyrene, and others. One or more of these are used.

Below, the method for manufacturing the ethylene-based polymer microparticles of the present invention is explained.

The ethylene-based polymer microparticles of the present invention are manufactured by conducting homopolymerization of ethylene or copolymerization of ethylene with one or more monomers selected from linear or branched α-olefins having 3 to 6 carbon atoms, cycloolefins, polar group-containing olefins, dienes, trienes, and aromatic vinyl compounds, using the magnesium-containing microparticles of the present invention explained below as a carrier component of the solid polymerization catalyst component.

[Magnesium-containing Microparticles]

First, the non-agglomerated spherical magnesium-containing microparticles, i.e. magnesium-containing carrier component, of the present invention, are specifically explained.

The magnesium-containing microparticles of the present invention contain all of magnesium atom, aluminum atom, and alkoxy group having 1 to 20 carbon atoms, and are insoluble to hydrocarbon solvents. The median diameter ($d_{50}$) thereof measured by laser diffraction scattering is $0.1\,\mu m \leq d_{50} \leq 5\,\mu m$, preferably 0.1 to 4.5 μm, more preferably 0.1 to 4.0 μm, and still more preferably 0.1 to 3.5 μm. Its variation coefficient (Cv) is 20% or less, preferably 18% or less, and more preferably 15% or less.

Alcohols having 1 to 20 carbon atoms corresponding to the above alkoxy group having 1 to 20 carbon atoms include alcoholic or phenolic compounds, for example, methanol, ethanol, n-propanol, i-propanol, n-butanol, i-butanol, t-butanol, n-pentanol, i-amyl alcohol, n-hexanol, n-heptanol, 2-ethylhexanol, n-octanol, dodecanol, octadecyl alcohol, oleyl alcohol, benzyl alcohol, phenylethanol, cumyl alcohol, i-propylbenzyl alcohol, etc.; halogen-containing alcohols such as trichloromethanol, trichloroethanol, and trichlorohexanol; phenols substituted with a lower alkyl group such as phenol, cresol, ethylphenol, nonylphenol, cumylphenol, and naphthol; and others. Among these preferred are methanol, ethanol, propanol, butanol, pentanol, i-amyl alcohol, hexanol, heptanol, 2-ethylhexanol, octanol, and dodecanol.

The magnesium-containing microparticles preferably have high sphericity or circularity. Generally these indices for particle shape can be determined by three-dimensional or two-dimensional optical image analysis.

When the magnesium-containing microparticles are used as a carrier component of polymerization catalysts in manufacturing the ethylene-based polymer microparticles of the present invention, it is desirable that the circularity coefficient is 0.85 or more, preferably 0.88 or more, especially preferably 0.9 or more. The circularity coefficient can be determined similarly to that of the ethylene-based polymer microparticles of the present invention.

Median Diameter ($d_{50}$) and Variation Coefficient (Cv)

The median diameter ($d_{50}$) and variation coefficient (Cv) referred to in the present invention are measured by laser diffraction scattering.

The Cv value of microparticles can be measured by a wet method with a laser diffraction scattering instrument (LS-13320 by Beckman Coulter, Inc.).

The Cv value is calculated by equation (1) below:

$$Cv(\%) = (\sigma_D/Dn) \times 100 \tag{1}$$

(in equation (1), $\sigma_D$ is standard deviation of particle diameter and Dn is weight-average particle diameter).

The magnesium-containing microparticles of the present invention are obtained by bringing magnesium halide into contact with an alcohol having 1 to 20 carbon atoms or a phenolic compound (this contact may be called "the 1st contact" hereafter) and followed by contact with an organoaluminum compound under specific conditions (this contact may be called "the 2nd contact" hereafter).

As the magnesium halide, magnesium chloride or magnesium bromide is preferably used. As such magnesium halide, a commercial product may be used as obtained, or it may be prepared from alkylmagnesium separately. In the latter case, magnesium halide may be used without isolation.

Magnesium halide may be brought into contact with an alcohol having 1 to 20 carbon atoms or a phenolic compound in the presence of solvent. The solvent includes, for example, aliphatic hydrocarbons such as hexane, heptane, octane, decane, dodecane, and kerosene; alicyclic hydrocarbons such as cyclopentane, cyclohexane, and methylcyclopentane; aromatic hydrocarbons such as benzene, toluene, and xylene; halogenated hydrocarbons such as ethylene dichloride, chlorobenzene, and dichloromethane; mixtures thereof; and others.

The contact is usually performed with heating. When heated, the temperature may be arbitrarily chosen unless it exceeds the boiling point of solvent used. The contact time depends on the contact temperature; for example, when n-decane is used as a solvent and the temperature is 130° C., the content will become homogeneous after contact for about 4 hours, which serves as an indicator of the completion of contact. The contact is usually conducted with equipment for promoting contact by stirring or otherwise. Although the system is usually heterogeneous at the beginning of contact, it gradually becomes homogeneous with the progress of contact, and finally becomes liquid.

When used as a carrier of solid catalyst component in manufacturing the ethylene-based polymer microparticles, the magnesium-containing microparticles of the present invention are preferably prepared via completely liquefied state in terms of powder properties of the ethylene-based polymer microparticles obtained by polymerization.

The product thus prepared by the contact of magnesium halide with an alcohol having 1 to 20 carbon atoms or a phenolic compound (may be called "the 1st contact product" hereafter) may be used after removing the solvent used in the contact or without distilling the solvent. Usually, the product is supplied for the following step without distilling the solvent.

The 1st contact product obtained by the above method is subsequently subjected to contact with an organoaluminum compound represented by general formula (1) below under specific conditions, i.e. the 2nd contact.

$$AlR_nX_{3-n} \quad (1)$$

In general formula (1), R is a hydrocarbon group having 1 to 20 carbon atoms, which specifically includes methyl, ethyl, propyl, butyl, hexyl, octyl, and decyl. X represents a halogen atom such as chlorine atom and bromine atom, or a hydrogen atom. n represents a real number of 1 to 3 and it is preferably 2 or 3. When a plurality of R is present, they may be the same or different from each other. When a plurality of X is present, they may be the same or different from each other. Specifically the followings are used as the organoaluminum compound. That is, organoaluminum compounds satisfying the above requirements include, trialkylaluminum such as trimethylaluminum, triethylaluminum, triisopropylaluminum, triisobutylaluminum, trioctylaluminum, and tri(2-ethylhexyl)aluminum; alkenylaluminum such as isoprenylaluminum; dialkylaluminum halide such as dimethylaluminum chloride, diethylaluminum chloride, diisopropylaluminum chloride, diisobutylaluminum chloride, and dimethylaluminum bromide; alkylaluminum sesquihalide such as methylaluminum sesquichloride, ethylaluminum sesquichloride, isopropylaluminum sesquichloride, butylaluminum sesquichloride, and ethylaluminum sesquibromide; alkylaluminum dihalide such as methylaluminum dichloride, ethylaluminum dichloride, isopropylaluminum dichloride, and ethylaluminum dibromide; alkylaluminum hydride such as diethylaluminum hydride and diisobutylaluminum hydride; and others, among which preferred are trimethylaluminum, triethylaluminum, triisobutylaluminum, trihexylaluminum, trioctylaluminum, diethylaluminum chloride, ethylaluminum sesquichloride, ethylaluminum dichloride, and diisobutylaluminum hydride.

One of the big points of the present invention is on the contact method and contact conditions in the 2nd contact. Specifically it is conducted by the method of adding the organoaluminum compound, represented by general formula (1) to the 1st contact product while mixed at high speeds by intense shear force. The equipment used for high-speed mixing of the 1st contact product is not particularly limited, and there may be used a common apparatus marketed as an emulsifier or disperser, which includes, for example, batch emulsifiers such as Ultra-Turrax (IKA Works), Polytron (Kinematica, Inc.), TK Autohomomixer (Tokushu Kika Kogyo Co., Ltd.), TK Neomixer (Tokushu Kika Kogyo Co., Ltd.), and National Cooking Mixer (Matsushita Electric Industrial Co., Ltd.); continuous emulsifiers such as Ebara Milder (Ebara Corp.), TK Pipeline homo mixer, TK Homomic line flow (Tokushu Kika Kogyo Co., Ltd.), Colloid mill (Nippon Seiki Co., Ltd.), Thrasher, Trigonal wet pulverizer (Mitsui Miike chemical engineering machinery), Cavitron (Eurotech company), and Fine flow mill (Pacific Machinery & Engineering Co., Ltd.); batch/continuous dual-mode emulsifiers such as Clearmix (M Technique Co., Ltd.) and Filmix (Tokushu Kika Kogyo Co., Ltd); high-pressure emulsifiers such as Microfluidizer (Mizuho Industrial Co., Ltd.), Nanomaker, Nanomizer (S.G.Engineering, Inc.), and APV Gaulin (Gaulin); and membrane emulsifier such as Membrane emulsifier (Reika Kogyo Co., Ltd.); vibrating emulsifier such as Vibromixer (Reika Kogyo Co., Ltd.); ultrasonic emulsifiers such as Ultrasonic homogenizer (Branson); and others.

Preferably, the 1st contact product has been diluted with a solvent at the time of the 2nd contact. As such a solvent, any hydrocarbon having no active hydrogen may be used without particular restriction, but usually it is efficient that the solvent used in the 1st contact is not distilled and used as a solvent for the 2nd contact. The organoaluminum compound may be added to the 1st contact product either after dilution with a solvent or without dilution. It is usually used with dilution with an aliphatic saturated hydrocarbon such as n-decane and n-hexane or an aromatic hydrocarbon such as toluene and xylene. The organoaluminum compound is usually added to the 1st contact product over 5 minutes to 5 hours. If the contact system can sufficiently remove heat, the addition may be conducted within short time, while, if the efficiency of heat removal is insufficient, it is recommended to add over a long period. The organoaluminum compound may be added at once or dividedly several times. When added in divided portions, the same amount of organoaluminum compound may be added every time or the amounts may be different from each other, and the temperatures of the 1st contact product on the adding operations may be the same or different from each other.

The organoaluminum compound represented by general formula (1) is used in the 2nd contact so that the amount of aluminum atoms is usually 0.1 to 50 times by mole, preferably 0.5 to 30 times by mole, more preferably 1.0 to 20 times by mole, furthermore preferably 1.5 to 15 times by mole, and especially preferably 2.0 to 10 times by mole of the amount of magnesium atoms in the 1st contact product.

The especially preferred mode of 2nd contact among methods of preparing a carrier by the 2nd contact is described below.

In the contact of the 1st contact product with the organoaluminum compound represented by general formula (1), the reaction is preferably conducted in liquid state, for example, in a manner such that a diluted solution of the magnesium compound in a hydrocarbon is brought into contact with the organoaluminum compound diluted with a hydrocarbon solvent. The amount of organoaluminum compound used herein varies with the type of compound and contact conditions; preferably, it is usually 2 to 10 mol per mole of the magnesium compound. The solid product differs in shape, size, or other properties according to the formation condition. In order to obtain the solid product with uniform shape and particle diameter, it is desirable to maintain intense shearing and high-speed mixing as mentioned above and to avoid rapid particle-forming reaction. For example, when the magnesium compound and the organoaluminum compound, both in liquid state, are mixed to form a solid product by reaction between them, it is recommended that they are mixed at such a low temperature that no rapid formation of solid occurs upon the contact and then the temperature is elevated to gradually form the solid product. By this method, the particle diameter of solid product can be readily controlled in sizes corresponding to ultra-fine particles, and there is easily provided a spherical ultra-fine solid product with very narrow particle size distribution.

By using a solid polymerization catalyst component wherein the magnesium-containing microparticles of the present invention are used as a carrier of polymerization catalyst, spherical ethylene-based polymer microparticles with very narrow particle size distribution can be produced.

[Method for Manufacturing Ethylene-based Polymer Microparticles]

Below, the method for manufacturing the ethylene-based polymer microparticles of the present invention is described.

The ethylene-based polymer microparticles of the present invention can be obtained by, in the presence of a polymerization catalyst component composed of:

a solid catalyst component, wherein on
(A') magnesium-containing microparticles of the present invention,
(B') transition metal compound or (C') liquid titanium compound is supported;
(D') organometallic compound; and optionally
(E') nonionic surfactant, polymerizing ethylene alone or polymerizing ethylene with at least one or more monomers selected from linear or branched α-olefins having 3 to 6 carbon atoms, cycloolefins, polar group-containing olefins, dienes, trienes, and aromatic vinyl compounds.

The solid catalyst component used in the present invention is firstly explained below.

"Supported" in the present invention means the state where, after transition metal compound (B') or liquid titanium compound (C') is agitated at room temperature in at least one solvent selected from hexane, decane, and toluene under atmospheric pressure for 1 minute to 1 hour, only 1 wt % or less of each compound is dissolved in the solvent.

There is no particular limitation on transition metal compound (B') used for preparing the solid catalyst component together with the magnesium-containing microparticles (A') of the present invention i.e., a magnesium-containing carrier component. For example, compounds disclosed in the following documents may be used.
1) Japanese Patent Laid-Open Publication No. H11-315109
2) Japanese Patent Laid-Open Publication No. 2000-239312
3) EP 1008595
4) WO 01/55213
5) Japanese Patent Laid-Open Publication No. 2001-2731
6) EP 1043341
7) WO 98/27124
8) Chemical Reviews 103, 283 (2003)
9) Bulletin of the Chemical Society of Japan 76, 1493 (2003)
10) Angewandte Chemie, International Edition in English 34 (1995)
11) Chemical Review 98, 2587 (1998)

Transition metal compound (B') can be supported on magnesium-containing microparticles (A') of the present invention by mixing magnesium-containing microparticles (A') and transition metal compound (B') with stirring in an inert solvent for predetermined time, followed by collection by filtration. The system may be heated at this time. The inert solvent includes, for example, aromatic hydrocarbons such as benzene, toluene, and xylene; aliphatic saturated hydrocarbons such as hexane, heptane, and decane; alicyclic hydrocarbons such as cyclohexane and methylcyclopentane; halogenated hydrocarbons such as ethylene chloride, chlorobenzene, and dichloromethane; and mixtures thereof. When heated, the temperature depends on the solvent to be used, but it is usually from the freezing point of solvent to 200° C., and preferably to 150° C. The mixing time, although depends on the temperature, is usually for 30 seconds to 24 hours, and preferably 10 minutes to 10 hours. The filtration may be conducted by a filtration method generally used in organic synthetic chemistry. The cake obtained after filtration may be washed, if needed, with an aromatic hydrocarbon or an aliphatic hydrocarbon exemplified above.

As liquid titanium compound (C') used for preparing the solid catalyst component using magnesium-containing microparticles (A') of the present invention, there may be specifically mentioned tetravalent titanium compounds represented by general formula (2) below:

$$Ti(OR)_n X_{4-n} \qquad (2)$$

(In the formula, R represents a hydrocarbon group, X represents a halogen atom, and n satisfies $0 \leq n \leq 4$.)

Specifically, such titanium compounds include titanium tetrahalide such as $TiCl_4$, $TiBr_4$, and $TiI_4$; alkoxytitanium trihalide such as $Ti(OCH_3)Cl_3$, $Ti(OC_2H_5)Cl_3$, $Ti(O-n-C_4H_9)Cl_3$, $Ti(OC_2H_5)Br_3$, and $Ti(O-iso-C_4H_9)Br_3$; dialkoxytitanium dihalide such as $Ti(OCH_3)_2Cl_2$, $Ti(OC_2H_5)_2Cl_2$, $Ti(O-n-C_4H_9)_2Cl_2$, and $Ti(OC_2H_5)_2Br_2$; trialkoxytitanium monohalide such as $Ti(OCH_3)_3Cl$, $Ti(OC_2H_5)_3Cl$, $Ti(O-n-C_4H_9)_3Cl$, and $Ti(OC_2H_5)_3Br$; tetraalkoxytitanium such as $Ti(OCH_3)_4$, $Ti(OC_2H_5)_4$, $Ti(O-n-C_4H_9)_4$, $Ti(O-iso-C_4H_9)_4$, and $Ti(O-2-ethylhexyl)_4$; and others.

Among these, halogen-containing titanium compounds are preferred, titanium tetrahalides are further preferred, and titanium tetrachloride is especially preferred. These titanium compounds may be used alone or in combination of two or more. Furthermore, these titanium compounds may be diluted with a hydrocarbon, a halogenated hydrocarbon compound, or the like.

When immobilizing liquid titanium compound (C') on magnesium-containing microparticles (A') of the present invention, magnesium-containing microparticles (A') and liquid titanium compound (C') are mixed with stirring for predetermined time, followed by collection by filtration, wherein the mixing is conducted by at least one method selected from i) a method of bringing them into contact in suspension state in the presence of an inert solvent, and ii) a method of bringing them into contact in a plurality of divided portions. At this time, the system may be heated. The inert solvent includes aromatic hydrocarbons such as benzene, toluene, and xylene; aliphatic saturated hydrocarbons such as hexane, heptane, and decane; alicyclic hydrocarbons such as cyclohexane and methylcyclopentane; halogenated hydrocarbons such as ethylene chloride, chlorobenzene, and dichloromethane; and mixtures thereof. When heated, the temperature depends on the solvent to be used, but it is usually from the freezing point of the solvent to 200° C., and preferably to 150° C. The mixing time, although depends on the temperature, is usually for 30 seconds to 24 hours, and preferably 10 minutes to 10 hours. The filtration may be conducted by a filtration method generally used in organic synthetic chemistry. The cake obtained after filtration may be washed, if needed, with an aromatic hydrocarbon or an aliphatic hydrocarbon exemplified above.

In preparing the solid catalyst component, an electron donor may be also used, if needed. The electron donor includes alcohols, phenols, ketones, aldehydes, carboxylic acids, acid halides, esters of an organic or inorganic acid, ethers, acid amides, acid anhydrides, ammonia, amines, nitrites, isocyanates, nitrogen-containing cyclic compounds, oxygen-containing cyclic compounds, and others.

More specifically, it includes alcohols having 1 to 18 carbon atoms such as methanol, ethanol, propanol, butanol, pentanol, hexanol, 2-ethylhexanol, octanol, dodecanol, octadecyl alcohol, oleyl alcohol, benzyl alcohol, phenylethyl alcohol, cumyl alcohol, isopropyl alcohol, and isopropylbenzyl alcohol; halogen-containing alcohols having 1 to 18 carbon atoms such as trichloromethanol, trichloroethanol, and trichlorohexanol; phenols having 6 to 20 carbon atoms optionally substituted with a lower alkyl group such as phenol, cresol, xylenol, ethylphenol, propylphenol, nonylphenol, cumylphenol, and naphthol; ketones having 3 to 15 carbon atoms such as acetone, methyl ethyl ketone, methyl isobutyl ketone, acetophenone, benzophenone, and benzoquinone; aldehydes having 2 to 15 carbon atoms such as acetaldehyde, propionaldehyde, octyl aldehyde, benzaldehyde, tolualdehyde, and naphthaldehyde; organic acid esters having 2 to 30 carbon atoms such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, γ-butyrolactone, δ-valerolactone, coumarin, phthalide, and ethyl carbonate; acid halides having 2 to 15 carbon atoms such as acetyl chloride, benzoyl chloride, toluoyl chloride, and anisoyl chloride; ethers having 2 to 20 carbon atoms such as methyl ether, ethyl ether, isopropyl ether, butyl ether, amyl ether, tetrahydrofuran, anisole, and diphenyl ether; acid amides such as N,N-dimethylacetamide, N,N-diethylbenzamide, and N,N-dimethyltoluamide; amines such as methylamine, ethylamine, dimethylamine, diethylamine, trimethylamine, triethylamine, tributylamine, tribenzylamine, tetramethylenediamine, and hexamethylenediamine; nitriles such as acetonitrile, benzonitrile, and tolunitrile; acid anhydride such as acetic anhydride, phthalic anhydride, and benzoic anhydride; pyrroles such as pyrrole, methylpyrrole, and dimethylpyrrole; pyrroline; pyrrolidine; indole; pyridines such as pyridine, methylpyridine, ethylpyridine, propylpyridine, dimethylpyridine, ethylmethylpyridine, trimethylpyridine, phenylpyridine, benzylpyridine, and choloropyridine; nitrogen-containing cyclic compounds such as piperidines, quinolines, and isoquinolines; oxygen-containing cyclic compounds such as tetrahydrofuran, 1,4-cineole, 1,8-cineole, pinolfuran, methylfuran, dimethylfuran, diphenylfuran, benzofuran, coumaran, phthalan, tetrahydropyran, pyran, and dihydropyran; and others.

As the organic acid ester, particularly preferred examples include polycarboxylic esters with a skeleton represented by general formula (3) below:

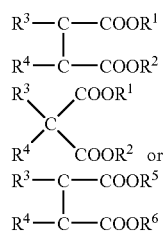

(3)

In the above formulae, $R^1$ represents a substituted or unsubstituted hydrocarbon group, $R^2$, $R^5$, and $R^6$ each represent a hydrogen atom or a substituted or unsubstituted hydrocarbon group, $R^3$ and $R^4$ each represent a hydrogen atom or a substituted or unsubstituted hydrocarbon group, and preferably at least one of $R^3$ and $R^4$ is a substituted or unsubstituted hydrocarbon group. $R^3$ and $R^4$ may bond to each other to form a ring. When the hydrocarbon group $R^1$ to $R^6$ is substituted, each substituent contains (a) heteroatom(s) such as N, O, and S and has a group such as C—O—C, COOR, COOH, OH, SO$_3$H, —C—N—C—, and NH$_2$.

Such polycarboxylic ester includes, specifically, aliphatic polycarboxylates such as diethyl succinate, dibutyl succinate, diethyl methylsuccinate, diisobutyl α-methylglutarate, diethyl methylmalonate, diethyl ethylmalonate, diethyl isopropylmalonate, diethyl butylmalonate, diethyl phenylmalonate, diethyl diethylmalonate, diethyl dibutylmalonate, monooctyl maleate, dioctyl maleate, dibutyl maleate, dibutyl butylmaleate, diethyl butylmaleate, diisopropyl β-methylglutarate, diallyl ethylsuccinate, di-2-ethylhexyl fumarate, diethyl itaconate, and dioctyl citraconate; alicyclic polycarboxylates such as diethyl 1,2-cyclohexanedicarboxylate, diisobutyl 1,2-cyclohexanedicarboxylate, diethyl tetrahydrophthalate, and diethyl nadate; aromatic polycarboxylates such as monoethyl phthalate, dimethyl phthalate, methyl ethyl phthalate, monoisobutyl phthalate, diethyl phthalate, ethyl isobutyl phthalate, di-n-propyl phthalate, diisopropyl phthalate, di-n-butyl phthalate, diisobutyl phthalate, di-n-heptyl phthalate, di-2-ethylhexyl phthalate, di-n-octyl phthalate, dineopentyl phthalate, didecyl phthalate, benzyl butyl phthalate, diphenyl phthalate, diethyl naphthalenedicarboxylate, dibutyl naphthalenedicarboxylate, triethyl trimellitate, and dibutyl trimellitate; heterocyclic polycarboxylates such as 3,4-furandicarboxylate; and others.

Other examples of polycarboxylic esters include esters of long-chain dicarboxylic acid such as diethyl adipate, diisobutyl adipate, diisopropyl sebacate, di-n-butyl sebacate, di-n-octyl sebacate, and di-2-ethylhexyl sebacate, and others.

In the present invention, as the electron donor, there may be also used organosilicon compounds represented by general formula (4-1) or (4-3) below, polyethers represented by general formula (5) below, or others.

$$R^p{}_n-Si-(OR^q)_{4-n} \quad (4\text{-}1)$$

(In the formula n is 1, 2, or 3. When n is 1, $R^p$ represents a secondary or tertiary hydrocarbon group. When n is 2 or 3, at least one of $R^p$s represents a secondary or tertiary hydrocarbon group, the others represents a hydrocarbon group, and a plurality of $R^p$s may be the same or different. $R^q$ is a hydrocarbon group having 1 to 4 carbon atoms and when 4-n is 2 or 3, $R^q$s may be the same or different from each other.)

The secondary or tertiary hydrocarbon group in the silicon compound represented by formula (4-1) includes cyclopentyl, cyclopentenyl, cyclopentadienyl, said groups having (a) substituent (s), and hydrocarbon groups in which the carbon atom adjacent to Si is secondary or tertiary.

Among these, dimethoxysilanes, especially dimethoxysilanes represented by general formula (4-2) below are preferred.

(4-2)

(In the formula, $R^P$ and $R^S$ each independently represent cyclopentyl, substituted cyclopentyl, cyclopentenyl, substituted cyclopentenyl, cyclopentadienyl, substituted cyclopentadienyl, or hydrocarbon group in which the carbon atom adjoining Si is secondary or tertiary.)

The organosilicon compounds represented by general formula (4-2) include, specifically, dicyclopentyldimethoxysilane, di-t-butyldimethoxysilane, di(2-methylcyclopentyl)dimethoxysilane, di(3-methylcyclopentyl)dimethoxysilane, di-t-amyldimethoxysilane, and others.

As the organosilicon compound, organosilicon compounds represented by general formula (4-3) below may also be used.

$$R_n-Si-(OR')_{4-n} \qquad (4\text{-}3)$$

(In the formula, R and R' are each a hydrocarbon group such as an alkyl group, an aryl group, and an alkylidene group; and n satisfies 0<n<4.)

Such organosilicon compounds represented by general formula (4-3) include, specifically, diphenyldimethoxysilane, diisopropyldimethoxysilane, di-n-propyldimethoxysilane, vinyltrimethoxysilane, vinyltriethoxysilane, phenyltriethoxysilane, n-propyltriethoxysilane, and others.

Furthermore as compounds similar to the organosilicon compounds represented by general formula (4-3), there may also be mentioned γ-chloropropyltrimethoxysilane, γ-aminopropyltriethoxysilane, chlorotriethoxysilane, ethyl silicate, butyl silicate, vinyltris(β-methoxyethoxy)silane, vinyltriacetoxysilane, dimethyltetraethoxysiloxane, and others.

The organosilicon compound represented by general formula (4-3) may include the organosilicon compound repressed by general formula (4-1). The organosilicon compounds may be used alone or in combination of two or more.

The polyether is a compound having two or more ether linkages connected via a plurality of atoms, i.e. a compound in which a plurality of atoms exist between at least two ether linkages (C—O—C) (i.e. between C—O—C and C—O—C). Specifically, it includes a compound having at least two ether linkages (C—O—C) connected via a plurality of atoms, wherein the atoms in plurality are carbon, silicon, oxygen, sulfur, phosphorus, boron, or two or more atoms selected from these, and others.

These atoms connecting ether linkages may have (a) substituent(s) containing at least one element selected from carbon, hydrogen, oxygen, halogen, nitrogen, sulfur, phosphorus, boron, and silicon. Among these, preferred is a compound in which a relatively bulky substituent bonds to an atom present between ether linkages and the atoms connecting ether linkages contain a plurality of carbon atoms.

Such compounds having two or more ether linkages include, for example, compounds represented by general formula (5) below:

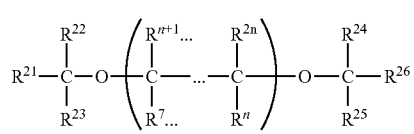

(5)

In general formula (5), n is an integer satisfying 2≦n≦10, and each of $R^1$ to $R^{26}$ is a substituent having at least one element chosen from carbon, hydrogen, oxygen, halogen, nitrogen, sulfur, phosphorus, boron, and silicon; any combinations in $R^1$ to $R^{26}$, preferably, in $R^1$ to $R^{2n}$, may jointly form a ring other than a benzene ring; and the main chain may contain (an) atom(s) other than carbon.

Compounds having two or more ether linkages as described above include
2-(2-ethylhexyl)-1,3-dimethoxypropane,
2-isopropyl-1,3-dimethoxypropane,
2-butyl-1,3-dimethoxypropane,
2-s-butyl-1,3-dimethoxypropane,
2-cyclohexyl-1,3-dimethoxypropane,
2-phenyl-1,3-dimethoxypropane,
2-cumyl-1,3-dimethoxypropane,
2-isopropyl-2-isobutyl-1,3-dimethoxypropane,
2-(2-phenylethyl)-1,3-dimethoxypropane,
2-(2-cyclohexylethyl)-1,3-dimethoxypropane,
2,2-dicyclohexyl-1,3-dimethoxypropane,
2,2-diethyl-1,3-dimethoxypropane,
2,2-dipropyl-1,3-dimethoxypropane,
2,2-dibutyl-1,3-dimethoxypropane,
2-methyl-2-propyl-1,3-dimethoxypropane,
2-methyl-2-benzyl-1,3-dimethoxypropane,
2-methyl-2-ethyl-1,3-dimethoxypropane,
2-methyl-2-isopropyl-1,3-dimethoxypropane,
2-methyl-2-phenyl-1,3-dimethoxypropane,
2-methyl-2-cyclohexyl-1,3-dimethoxypropane,
2-methyl-2-isobutyl-1,3-dimethoxypropane,
2,2-diisobutyl-1,3-dimethoxypropane,
2,2-diphenyl-1,3-dimethoxypropane,
2,2-bis(cyclohexylmethyl)-1,3-dimethoxypropane,
2,2-diisobutyl-1,3-diethoxypropane,
2,2-diisobutyl-1,3-dibutoxypropane,
2-isobutyl-2-isopropyl-1,3-dimethoxypropane,
2,2-di-s-butyl-1,3-dimethoxypropane,
2,2-di-t-butyl-1,3-dimethoxypropane,
2,2-dineopentyl-1,3-dimethoxypropane,
2-isopropyl-2-isopentyl-1,3-dimethoxypropane,
2-cyclohexyl-2-cyclohexylmethyl-1,3-dimethoxypropane,
2,3-diphenyl-1,4-diethoxybutane,
2,3-dicyclohexyl-1,4-diethoxybutane,
2,3-dicyclohexyl-1,4-diethoxybutane,
2,3-diisopropyl-1,4-diethoxybutane,
2,4-diphenyl-1,5-dimethoxypentane,
2,5-diphenyl-1,5-dimethoxyhexane,
2,4-diisopropyl-1,5-dimethoxypentane,
2,4-diisobutyl-1,5-dimethoxypentane,
2,4-diisoamyl-1,5-dimethoxypentane,
1,2-diisobutoxypropane,
1,2-diisobutoxyethane,
1,3-diisoamyloxyethane,
1,3-diisoamyloxypropane,
1,3-diisoneopentyloxyethane,
1,3-dineopentyloxypropane,
1,2-bis(methoxymethyl)cyclohexane,
3,3-diisobutyl-1,5-dioxanonane,
6,6-diisobutyldioxaheptane,
1,1-dimethoxymethylcyclopentane,
2-methyl-2-methoxymethyl-1,3-dimethoxypropane,
2-cyclohexyl-2-ethoxymethyl-1,3-diethoxypropane,
2-cyclohexyl-2-methoxymethyl-1,3-dimethoxypropane,
2,2-diisobutyl-1,3-dimethoxycyclohexane,
2-isopropyl-2-isoamyl-1,3-dimethoxycyclohexane,
2-cyclohexyl-2-methoxymethyl-1,3-dimethoxycyclohexane,
2-isopropyl-2-methoxymethyl-1,3-dimethoxycyclohexane,
2-isobutyl-2-methoxymethyl-1,3-dimethoxycyclohexane,
2-cyclohexyl-2-ethoxymethyl-1,3-dimethoxycyclohexane,
2-isopropyl-2-ethoxymethyl-1,3-dimethoxycyclohexane,
2-isobutyl-2-ethoxymethyl-1,3-dimethoxycyclohexane,
diphenylbis(methoxymethyl)silane,
di-t-butylbis(methoxymethyl)silane, and
cyclohexyl-t-butylbis(methoxymethyl)silane.

Among these, 1,3-diethers are preferred, and 2-isopropyl-2-isobutyl-1,3-dimethoxypropane, 2,2-diisobutyl-1,3-dimethoxypropane, 2-isopropyl-2-isopentyl-1,3-dimethoxypropane, 2,2-dicyclohexyl-1,3-dimethoxypropane, and 2,2-bis(cyclohexylmethyl)-1,3-dimethoxypropane are especially preferred.

(D') Organometallic Compound

As organometallic compound (D') used in the present invention, specifically, there may be optionally used any organometallic compound of a metal of Group-1, 2, 12, or 13 of the periodic table such as general formulae (6-1) to (6-3) below:

$$R^a_m Al(OR^b)_n H_p X_q \qquad (6\text{-}1)$$

(In the formula, $R^a$ and $R^b$ may be the same or different from each other and represent hydrocarbon groups each having 1 to 20 carbon atoms, preferably 1 to 10 carbon atoms, and more preferably 1 to 8 carbon atoms. X represents a halogen atom. m, n, p, and q are numbers satisfying $0<m\leq3$, $0\leq n<3$, $0\leq p<3$, $0\leq q<3$, and $m+n+p+q=3$.), which represents organoaluminum compounds. Specific examples of such compounds include trimethylaluminum, triethylaluminum, triisobutylaluminum, trioctylaluminum, diisobutylaluminum hydride, and diethylaluminum ethoxide.

$$M^a Al R^a_4 \qquad (6\text{-}2)$$

(In the formula, $M^a$ represents Li, Na, or K, and $R^a$ represents a hydrocarbon group having 1 to 15 carbon atoms, preferably 1 to 4 carbon atoms.), which represents complex alkylated compounds of a metal of Group-1 of the periodic table and aluminum. Such compounds include $LiAl(C_2H_5)_4$, $LiAl(C_7H_{15})_4$, and others.

$$R^a R^b M^b \qquad (6\text{-}3)$$

(In the formula, $R^a$ and $R^b$ may be the same or different from each other, and each represent a hydrocarbon group having 1 to 15 carbon atoms, preferably 1 to 4 carbon atoms. $M^b$ is Mg, Zn, or Cd.), which represents dialkyl compounds of a metal of Group-2 or Group-12 of the periodic table.

Among organometallic compounds (D') described above, organoaluminum compounds are preferred, and organoaluminum compounds of general formula (6-1) are especially preferred. Such organometallic compounds may be used alone or in combination of two or more.

(E') Nonionic Surfactant

As nonionic surfactant (E'), there is preferably one or more compounds selected from (E'-1) poly(alkylene oxide) block, (E'-2) higher aliphatic amide, (E'-3) poly(alkylene oxide), (E'-4) poly(alkylene oxide) alkyl ether, (E'-5) alkyldiethanolamine, and (E'-6) polyoxyalkylenealkylamine described below.

(E'-1) Poly(alkylene Oxide) Block

As poly(alkylene oxide) block (E'-1) used in the present invention, there may be used any publicly-known conventional poly(alkylene oxide) block commonly used as a nonionic surfactant, without restriction.

(E'-2) Higher Aliphatic Amide

As higher aliphatic amide (E'-2) used in the present invention, there may be used any publicly-known conventional higher aliphatic amide commonly used as a nonionic surfactant, without restriction.

(E'-3) Poly(alkylene Oxide)

As poly(alkylene oxide) (E'-3) used in the present invention, any publicly-known conventional poly(alkylene oxide) may be used without restriction.

(E'-4) Poly(alkylene Oxide) Alkyl Ether

As poly(alkylene oxide) alkyl ether (E'-4) used in the present invention, there may be used any publicly-known conventional poly(alkylene oxide) alkyl ether commonly used as a nonionic surfactant, without restriction.

(E'-5) Alkyldiethanolamine

As alkyldiethanolamine (E'-5) used in the present invention, there may be used any publicly-known conventional alkyldiethanolamine commonly used as a nonionic surfactant, without restriction.

(E'-6) Polyoxyalkylenealkylamine

As polyoxyalkylenealkylamine (E'-6) used in the present invention, there may be used any publicly-known conventional polyoxyalkylenealkylamine commonly used as a nonionic surfactant, without restriction.

Such a nonionic surfactant is preferably liquid at room temperature in terms of ease in handling. The nonionic surfactant may be used as neat liquid or as a solution after dilution with a solvent. "Diluted state" referred to in the present invention includes any state wherein a nonionic surfactant is mixed with, or dispersed in, a liquid inert to the nonionic surfactant. That is, it is a solution or dispersion and, more specifically, a solution, suspension, or emulsion. Above all, preferred is a state wherein a nonionic surfactant is miscible with a solvent to form a solution.

The inert liquid includes, for example, aliphatic hydrocarbons, alicyclic hydrocarbons, aromatic hydrocarbons, unsaturated aliphatic hydrocarbons, halogenated hydrocarbons, and others. In the case of aliphatic hydrocarbons, alicyclic hydrocarbons, aromatic hydrocarbons, and halogenated hydrocarbons, such hydrocarbons can preferably form a solution by mixing with a nonionic surfactant. More preferably, nonionic surfactant (E') is used together with an aliphatic hydrocarbon such as pentane, hexane, heptane, octane, decane, dodecane, kerosene, and mineral oil, or an alicyclic hydrocarbon such as cyclopentane, cyclohexane, and methylcyclopentane, since such combination can prevent adhesion of a polymer to walls of a polymerization reactor or to stirring blades in suspension polymerization, and hence increase the productivity.

The following is further explanation on the method for manufacturing the ethylene-based polymer microparticles with the polymerization catalyst component of the present invention.

On the solid catalyst component used in the present invention, ethylene may be pre-polymerized.

In the present invention, polymerization may be carried out by suspension polymerization or gas-phase polymerization. The inert hydrocarbon medium used in suspension polymerization includes, specifically, aliphatic hydrocarbons such as propane, butane, pentane, hexane, heptane, octane, decane, dodecane, and kerosene; alicyclic hydrocarbons such as cyclopentane, cyclohexane, and methylcyclopentane; aromatic hydrocarbons such as benzene, toluene, and xylene; halogenated hydrocarbons such as ethylene chloride, chlorobenzene, and dichloromethane; mixtures thereof; and others. The olefin itself may also be used as a solvent.

In manufacturing ethylene-based polymer microparticles using the above polymerization catalyst component of the present invention, transition metal compound (B') is used in an amount of usually $10^{-11}$ to 10 mmol, preferably $10^{-9}$ to 1 mmol in terms of the transition metal atom in component (B') per litter of reaction volume i.e., the volume of liquid phase of reaction system in the polymerization reactor in the case of suspension polymerization, or the volume available for reaction in the polymerization reactor in the case of gas-phase polymerization.

Organometallic compound (D') is used at 0.1 to 500 wt %, desirably 0.2 to 400 wt % with respect to magnesium-containing microparticles (A') of the present invention.

The polymerization temperature is usually −50 to +200° C., and preferably 0 to 170° C. The polymerization pressure is usually atmospheric pressure to 100 kg/cm², preferably atmospheric pressure to 50 kg/cm². The polymerization may be performed in any of batch system, semi-continuous system, and continuous system. Polymerization may also be conducted dividedly into two or more steps with reaction conditions varied.

The molecular weight of the ethylene-based polymer microparticles obtained can be controlled by introducing hydrogen in the polymerization system or by changing polymerization temperature. Furthermore, it can also be controlled by using different component (C').

In manufacturing the ethylene-based polymer microparticles of the present invention, it is preferred to remove inorganic substances in the obtained microparticles.

Inorganic substances in olefin-based polymer microparticles can be removed by mixing the microparticles with a mixture of an alcohol having 2 to 10 carbon atoms and a chelate compound (F') and stirring at 75° C. or higher temperatures.

Such alcohol having 2 to 10 carbon atoms includes, but not limited to, ethanol, n-propyl alcohol, isopropyl alcohol, n-butyl alcohol, isobutyl alcohol, t-butyl alcohol, n-pentyl alcohol, n-hexyl alcohol, n-heptyl alcohol, n-octyl alcohol, 2-ethylhexyl alcohol, n-nonyl alcohol, n-decyl alcohol, and others. Among these, isopropyl alcohol, n-butyl alcohol, isobutyl alcohol, t-butyl alcohol, and 2-ethylhexyl alcohol are preferably used.

A chelate compound (F') may be any compound that can form a chelate complex with magnesium or aluminum, which is an inorganic metal in the polymer. It is preferably a diketone, and particularly, acetylacetone is more preferably used.

Reaction for removing inorganic substances is conducted under atmosphere of inert gas such as nitrogen, and consists of i) step of mixing microparticles, alcohol, and a chelate compound (F') at room temperature, subsequently heating with stirring, ii) step of conducting the reaction at a predetermined temperature for a predetermined period, and iii) step of filtering, washing, and drying the slurry. In the first mixing step, 3 to 100 parts by weight of the alcohol, 2 to 100 parts by weight of the chelate compound (F') are mixed with 1 part by weight of the polymer. Here, the quantitative ratio of the alcohol to the chelate compound (F') is preferably 98/2 to 50/50. The reaction temperature is 75° C. to 130° C., preferably 80° C. to 120° C. The reaction time is for 10 minutes to 10 hours, and preferably 0.5 hours to 5 hours. After the reaction, the microparticles are obtained by filtering, washing, and drying.

When inorganic substances are removed from the ethylene-based polymer microparticles according to the present invention, in order to trap hydrogen chloride generated by reaction of the chelate compound (F') and a catalyst component, acid-absorber (G') such as ethylene oxide and propylene oxide may also be added, if needed.

Acid-absorber (G') may be added in 3 to 10 parts by weight per 100 parts by weight of the alcoholic solvent. The acid-absorber may be supplied at the beginning of reaction or may be added in the middle of reaction.

When ethylene-based polymer microparticles are obtained by slurry polymerization or gas-phase polymerization using the spherical ultra-fine carrier component with narrow particle size distribution as described above, the resultant polymer is spherical ultra-fine particles with narrow size distribution and good flowability. This polymer does not adhere to walls of the polymerization reactor or stirring blades.

Then, the functional group-containing ethylene-based polymer microparticles according to the present invention and manufacture method thereof are explained.

[Functional Group-containing Ethylene-based Polymer Microparticles]

The functional group-containing ethylene-based polymer microparticles of the present invention have features that (B) at least 95 wt % or more of particles pass through a mesh screen having an opening of 37 μm, (C) the median diameter ($d_{50}$) measured by laser diffraction scattering is 3 μm≦$d_{50}$≦25 μm, (E) the variation coefficient (Cv) of particle diameter is 20% or less, and (F) the infrared absorption spectrum after treatment with methanol is substantially the same as the infrared absorption spectrum before treatment with methanol; and have one or more functional groups selected from vinyl group, vinylene group, vinylidene group, oxygen-containing group, nitrogen-containing group, boron-containing group, sulfur-containing group, phosphorus-containing group, silicon-containing group, germanium-containing group, halogen-containing group, and tin-containing group.

When the functional group-containing ethylene-based polymer microparticles of the present invention are classified using a vibrating sieve or an ultrasonic vibration sieve, the fraction of particles passing through a mesh screen having an opening of 37 μm (Tyler #400) is not less than 95 wt %, more preferably not less than 98 wt %, still more preferably not less than 99.7%, and most preferably 100%. Namely, if 95 wt % or more of the functional group-containing ethylene-based polymer microparticles passes through the screen, it means that the amount of coarse particles present therein is low. In such polymer particles, the closest packing, which is ideal packing as powder, is not inhibited by lowered flowability or poor dispersibility due to existence of coarse particles, and therefore, they are sufficiently satisfactory in the above uses as novel high-performance materials.

The median diameter ($d_{50}$) and variation coefficient (Cv) referred to in the present invention are measured by laser diffraction scattering.

The median diameter ($d_{50}$) of the functional group-containing ethylene-based polymer microparticles of the present invention is 3 μm≦$d_{50}$≦25 μm, and preferably 3 μm≦$d_{50}$≦10 μm.

When the functional group-containing ethylene-based polymer microparticles have an average particle diameter of 3 μm or more, they can be relatively easily handled in forming, and hardly pollute surrounding environment with microparticles. Therefore, when used in manufacturing various precision equipments, sanitary goods, or others, the inferior quality caused by environmental pollution can be easily controlled.

Such polymer microparticles are also excellent in securing safety in working environment, since adhesion to clothes or others is reduced and inhalation to the human body is also suppressed. Furthermore, when such microparticles are compression-molded for making sintered filters or others, they can be relatively easily handled and well packed in mold, enabling efficient production of filters with a uniform pore size.

Moreover, when the average particle diameter is 25 μm or less, especially 10 μm or less, said particles can be suitably used as filler of columns for efficiently separating chemical or biological substances, adsorbents, and catalyst carriers because of large specific surface area per unit mass of particles. Since the properties of functional group-containing ethylene-based polymer microparticles affect the physical properties after forming, when the microparticles with the above properties are used as a material for sintered filters, filters with small pore size can be obtained; and when used as a cosmetic material, such microparticles also give good touch effect to the skin.

While polyethylene microparticles synthesized by usual suspension polymerization have a Cv value of 30% or more, in the present invention, any material with a Cv value over 20% is beyond its object, and the Cv value is preferably 18% or less, and more preferably 15% or less. Besides, in the present invention, the functional group-containing ethylene-based polymer microparticles have preferably high sphericity or circularity. Generally these indices of particle shape can be determined by three-dimensional or two-dimensional optical image analysis.

The Cv value of microparticles can be measured by a wet method with a laser diffraction scattering instrument (LS-13320 by Beckman Coulter, Inc.).

The Cv value is calculated by equation (1) below:

$$Cv(\%) = (\sigma_D/Dn) \times 100 \quad (1)$$

(In equation (1), $\sigma_D$ is standard deviation of particle diameter and Dn is weight-average particle diameter.)

The intrinsic viscosity [η] of functional group-containing ethylene-based polymer microparticles of the present invention is the value measured at 135° C. using decalin as solvent, which can be measured similarly to that of the ethylene-based polymer microparticles of the present invention.

The functional group-containing ethylene-based polymer microparticles of the present invention has an intrinsic viscosity [η] in the range of 0.1 to 50 dl/g, preferably 0.15 to 50 dl/g, and more preferably 0.2 to 50 dl/g. When the intrinsic viscosity [η] of functional group-containing ethylene-based polymer microparticles is larger than 0.1 dl/g, there is no possibility of partial melting of the polymer particles by heat generated during polymerization or partial dissolution of the resultant polymer into the polymerization solvent in slurry polymerization. Thus, it is considered that the shape of polymer particles will not disintegrate and that the particles will not agglomerate each other. Moreover, when the intrinsic viscosity [η] is 6 dl/g or more, or preferably 10 dl/g or more, the polymer is excellent in abrasion resistance, impact resistance, and self-lubricity.

"Treatment with methanol" of the functional group-containing ethylene-based polymer microparticles of the present invention specifically means that stirring a suspension of 1 part by weight of the microparticles in 100 parts by weight of methanol for 30 minutes at room temperature, followed by filtration and drying under reduced pressure at 80° C. for 10 hours. "Infrared absorption spectra are substantially the same" means that the adsorption intensity I in infrared absorption spectrum satisfies equation (2) below:

$$[I\lambda(f) - I\lambda(i)]/I\lambda(i) \leq 0.1 \quad (2)$$

In equation (2), $I\lambda(i)$ represents the adsorption intensity at the wavelength $\lambda_0$ before treatment with methanol, $I\lambda(f)$ represents the adsorption intensity at wavelength $\lambda_0$ after treatment with methanol, and $\lambda_0$ is 300 to 4000 cm$^{-1}$.

Specifically, the functional groups are unsaturated bond-containing groups such as vinyl, vinylidene, and vinylene; oxygen-containing groups such as epoxy group, hydroxyl group, carboxyl group, aldehyde group, ketone group, polyethylene glycol group, and polypropylene glycol group; nitrogen-containing groups such as amino group, nitro group, imino group, amide group, and nitrile group; fluorine-containing groups such as fluorine atom and perfluoroalkyl group; sulfur-containing groups such as thiol group, sulfonyl group, chlorothionyl group, and sulfonamido group; silicon-containing groups such as alkylsilyl group and siloxane group; germanium-containing groups such as alkylgermyl group; and tin-containing groups such as alkylstannyl group.

Among these functional groups, an unsaturated bond-containing group such as vinyl, vinylidene, and vinylene, carboxyl (carboxylate) group, or ester group is contained in ethylene-based polymer microparticles obtained by homopolymerization of ethylene or copolymerization of ethylene with one or more monomers selected from α-olefins having 3 to 6 carbon atoms, dienes, trienes, and polar group-containing olefins in the presence of a specific olefin-polymerization catalyst component. Epoxy group, sulfonyl group, hydroxyl group, silyl group, or halogen group is contained in microparticles by chemically treating the unsaturated bond-containing microparticles with at least one compound selected from epoxidizing agents, sulfonating agents, maleic anhydride, hydroboration agents, diisobutylaluminum hydride, silylating agents, and halogenating agents.

For example, for manufacturing epoxy group-containing ethylene-based polymer microparticles, the epoxidation method is exemplified by, but not limited to, the followings:

[1] oxidation by a peracid such as performic acid, peracetic acid, and perbenzoic acid;
[2] oxidation by titanosilicate and hydrogen peroxide;
[3] oxidation by a rhenium oxide catalyst such as methyltrioxorhenium and hydrogen peroxide;
[4] oxidation by a porphyrin complex catalyst, such as manganese porphyrin or iron porphyrin, and hydrogen peroxide or hypochlorite salt;
[5] oxidation by a salen complex, such as manganese-salen, and hydrogen peroxide or hypochlorite;
[6] oxidation by a triazacyclononane (TACN) complex, such as manganese-TACN, and hydrogen peroxide; and
[7] oxidation by hydrogen peroxide in the presence of a Group-6 transition metal catalyst, such as tungsten compound, and a phase transfer catalyst.

Amino group, siloxane group, poly(ethylene glycol) group, poly(propylene glycol) group, or perfluoroalkyl group is contained in microparticles manufactured by treating the epoxy or hydroxyl group-containing microparticles with an amine, ethylene glycol, poly(ethylene glycol) or its amino-derivative, propylene glycol or its amino-derivative, poly(propylene glycol), a siloxane, a perfluoroalkyl ester, or others. Hydroxyl group, carboxyl group, amino group, vinylene group, or fluorine atom is also contained in microparticles by treating the above functional group-containing microparticles or polyethylene microparticles containing substantially no functional groups with an oxidizing strong acid, treatment with steam, corona discharge, plasma exposure, electron beam irradiation, laser irradiation, or UV irradiation.

Desirably, the number of these functional groups is 0.01 to 20, preferably 0.02 to 20, more preferably 0.02 to 10, and furthermore preferably 0.02 to 8 per 1000 carbon atoms in constituting particles as measured by IR (infrared absorption spectroscopy) or NMR (nuclear magnetic resonance spectroscopy).

Below, the quantitative method of vinyl and vinylidene groups by IR is described as an example.

Infrared Absorption Method (Infrared Absorption Spectroscopy)

A solid thin film of about 0.15 cm to about 0.25 cm in thickness is prepared from a standard sample by heat rolling, and the infrared absorption spectrum between 1000 cm$^{-1}$ and 850 cm$^{-1}$ is measured using a commercial infrared spectrophotometer (Jasco Corp.: DS-702G).

<Method for Determining the Number of Vinyl Groups>

1-Eicosene (20 carbon atoms) is used as a model substance.
1) Confirm that out-of-plane bending mode of this substance absorbs at 910 cm$^{-1}$.
2) Measure the absorbance of this band and film thickness for samples containing known number of vinyl groups using polyethylene containing no 1-eicosene and unsaturated bonds to calculate the absorbance per unit thickness.
3) Plot relationship between the absorbance per unit film thickness and the number of vinyl groups, which should give an approximately linear calibration curve.

Now, by measuring the absorbance per unit thickness of each sample, the number of vinyl groups can be determined using the calibration curve.

<Method for Determining Number of Vinylidene Groups>

The calibration curve is obtained as that for number of vinyl groups described above. In this case, 2,5-dimethyl-1,5-hexadiene is used as the model substance, and the absorption band observed at 890 cm$^{-1}$ is used.

The constituent of the functional group-containing ethylene-based polymer microparticles of the present invention preferably consists of 90 to 100 mol % of constitutional unit derived from ethylene and 0 to 10 mol % of constitutional unit derived from one or more monomers selected from linear or branched α-olefins having 3 to 6 carbon atoms, cycloolefins, polar group-containing olefins, dienes, trienes, and aromatic vinyl compounds.

The linear or branched α-olefins having 3 to 6 carbon atoms include propylene, 1-butene, 3-methyl-1-butene, 1-pentene, 3-methyl-1-butene, 1-hexene, 4-methyl-1-pentene, and 3-methyl-1-pentene, among which, propylene, 1-butene, 4-methyl-1-pentene, and 1-hexene are preferred.

The cycloolefins include cyclopentene, cycloheptene, norbornene, 5-methyl-2-norbornene, tetracyclododecene, 2-methyl-1,4,5,8-dimethano-1,2,3,4,4a,5,8,8a-octahydronaphthalene, and others.

The polar group-containing olefins include α,β-unsaturated carboxylic acids such as acrylic acid, methacrylic acid, fumaric acid, maleic anhydride, itaconic acid, itaconic anhydride, and bicyclo[2.2.1]-5-heptene-2,3-dicarboxylic anhydride; and metal salts of α,β-unsaturated carboxylic acid such as sodium, potassium, lithium, zinc, magnesium, or calcium salt of said acid; α,β-unsaturated carboxylic esters such as methyl acrylate, ethyl acrylate, n-propyl acrylate, isopropyl acrylate, n-butyl acrylate, isobutyl acrylate, tert-butyl acrylate, 2-ethylhexyl acrylate, methyl methacrylate, ethyl methacrylate, n-propyl methacrylate, isopropyl methacrylate, n-butyl methacrylate, and isobutyl methacrylate; vinyl esters such as vinyl acetate, vinyl propionate, vinyl caproate, vinyl caprate, vinyl laurate, vinyl stearate, and vinyl trifluoroacetate; unsaturated glycidyl compounds such as glycidyl acrylate, glycidyl methacrylate, and monoglycidyl itaconate; and others.

The dienes and trienes include butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinylnorbornene, dicyclopentadiene, 7-methyl-1,6-octadiene, 4-ethylidene-8-methyl-1,7-nonadiene, and 5,9-dimethyl-1,4,8-decatriene.

The aromatic vinyl compounds include, for example, styrene, monoalkylstyrene or polyalkylstyrene such as o-methylstyrene, m-methylstyrene, p-methylstyrene, o,p-dimethylstyrene, o-ethyistyrene, m-ethylstyrene, and p-ethylstyrene; functional group-containing styrene derivatives such as methoxystyrene, ethoxystyrene, vinylbenzoic acid, methyl vinylbenzoate, vinyl benzyl acetate, hyd roxystyrene, o-chiorostyrene, p-chlorostyrene, and divinylbenzene; 3-phenylpropylene, α-methylstyrene, and others. One or more of these are used.

Below, methods for manufacturing the functional group-containing ethylene-based polymer microparticles of the present invention are described. The manufacture methods are roughly classified into the first method, the second method, the third method, and the fourth method, and the fifth method, which is one embodiment thereof, but the manufacture method is in no way limited thereto, as far as the product fulfils properties of the functional group-containing ethylene-based polymer microparticles of the present invention.

The functional group-containing ethylene-based polymer microparticles of the present invention can be manufactured by the first or second method below using an olefin-polymerization catalyst component comprising a solid catalyst component, which is composed of a transition metal complex component and the above magnesium-containing carrier component, and an organometallic compound. Besides, they can also be manufactured by applying the third or fourth method to the ethylene-based polymer microparticles manufactured above. Furthermore, the functional group-containing ethylene-based polymer microparticles of the present invention may be manufactured using the fifth method.

The First Method

The first method for manufacturing the functional group-containing ethylene-based polymer microparticles of the present invention is a method of manufacturing, like the above ethylene-based polymer microparticles, by homopolymerization of ethylene or copolymerization of ethylene with one or more monomers selected from linear or branched α-olefins having 3 to 6 carbon atoms, cycloolefins, dienes, and aromatic vinyl compounds in the presence of an olefin-polymerization catalyst component comprising a solid catalyst component, which is composed of the transition metal complex component disclosed in Japanese Patent Laid-Open Publication No. H11-315109, Japanese Patent Laid-Open Publication No. 2000-239312, EP1043341, EP1008595, WO 99/12981, or Japanese Patent Application 2003-173479 and the above magnesium-containing carrier component of the present invention, and an organometallic compound. The microparticles obtained by this method have an unsaturated bond-containing group that is a vinyl, vinylene, or vinylidene group as a functional group.

The Second Method

The second method for manufacturing the functional group-containing ethylene-based polymer microparticles of the present invention is a method of manufacturing, like the above ethylene-based polymer microparticles, by homopolymerization of ethylene or copolymerization of ethylene with one or more monomers selected from dienes, trienes, and polar group-containing olefins in the presence of an olefin-polymerization catalyst component comprising a solid catalyst component, which is composed of the transition metal complex component disclosed in Japanese Patent Laid-Open Publication No. H11-315109, Chemical Review 100, 1169 (2000), Chemical Review 103, 283 (2003), Japanese Patent Application 2003-173479, Angewandte Chemie, International Edition in English 34 (1995), or Chemical Review, 98, 2587 (1998) and the above magnesium-containing carrier component of the present invention, and an organometallic compound. The functional group contained in the microparticles obtained by this method is an unsaturated bond-containing group that is a vinyl, vinylene, or vinylidene group, or a polar functional group such as carboxyl (carboxylate) group and an ester group.

The Third Method (Surface-treatment of Ethylene-based Polymer Microparticles by Chemical Reaction)

The third method for manufacturing the functional group-containing ethylene-based polymer microparticles of the present invention is a method of manufacturing by treating ethylene-based polymer microparticles with an epoxidizing agent, a sulfonating agent, maleic anhydride, a hydroboration agent, an alkylaluminum, a silylation agent, a halogenating agent, chromium-sulfuric acid, chromic acid, nitric acid, or others, in which the ethylene-based polymer microparticles are manufactured by homopolymerization of ethylene or copolymerization of ethylene with one or more monomers selected from linear or branched α-olefin having 3 to 6 carbon atoms, cycloolefins, dienes, trienes, and polar group-containing olefins using a polymerization catalyst component, which is composed of the transition metal complex component and the magnesium-containing carrier component of the present invention explained above, and an organometallic compound used in the first or second method. The microparticles obtained by this method have a functional group such as epoxy group, hydroxyl group, carboxyl group, silyl group, halogen group, and sulfonic group.

The Fourth Method (Physical Surface-treatment of Ethylene-based Polymer Microparticles)

The fourth method for manufacturing the functional group-containing ethylene-based polymer microparticles of the present invention is a method of subjecting the ethylene-based polymer microparticles obtained by either of the first, second and third methods to surface modification with steam treatment, plasma exposure, electron beam irradiation, laser irradiation, or UV irradiation. The microparticles obtained by this method have a functional group such as vinylene, hydroxyl, carboxyl, carbonyl, amino, fluorine, and silyl group.

The Fifth Method (Treatment of Ethylene-based Polymer Microparticles Containing Aluminum at the Polymer Chain End by Chemical Reaction)

The fifth method for manufacturing the functional group-containing ethylene-based polymer microparticles of the present invention comprises:

Step 1 wherein ethylene-based polymer microparticles containing aluminum at the polymer chain end are obtained, in the presence of an olefin-polymerization catalytic component comprising a solid catalyst component in which the specific transition metal compound represented by general formula (7) or (8) below is supported on (A') carrier component that is the magnesium-containing microparticles of the present invention; and (D') organometallic compound, by homopolymerization of ethylene or copolymerization of ethylene with one or more monomers selected from linear or branched α-olefins having 3 to 10 carbon atoms and cycloolefins, and Step 2 wherein the obtained ethylene-based polymer microparticles containing aluminum at the polymer chain end are reacted with oxygen, a halogen-containing compound, a nitrogen-containing compound, or a sulfur-containing compound to obtain the ethylene-based polymer microparticles having one functional group such as hydroxyl group, halogen group, nitrogen-containing group, or sulfur-containing group.

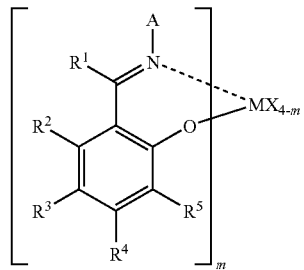

(7)

[In the formula, M represents Zr or Hf; m represents an integer of 1 or 2; A represents a saturated or unsaturated six-membered cyclic hydrocarbon group having one or more alkyl substituents in the position-2; $R^1$ to $R^5$ may be the same or different from each other and each represent a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group, or a tin containing-group, and two or more of them may be linked to each other to form (a) ring(s); and when m is 2, two of groups represented by $R^1$ to $R^5$ may be linked (however, two $R^1$s should not be linked to each other). (4-m) is the number satisfying the valence of M. X represents a hydrogen atom, a halogen atom, a hydrocarbon group, an oxygen-containing group, a sulfur-containing group, a nitrogen-containing group, a boron-containing group, an aluminum containing-group, a phosphorus-containing group, a halogen containing-group, a heterocyclic compound residue, a silicon-containing group, a germanium-containing group, or a tin-containing group. When m is 2 or greater, a plurality of groups represented by X may be the same or different from each other and any of the plurality of groups represented by X may bond to each other to form (a) ring(s).]

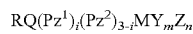

(8)

[In the formula, $RQ(Pz^1)_i(Pz^2)_{3-i}$ is a tridentate anionic or neutral ligand, wherein R is a group selected from the group consisting of a hydrogen atom, a halogen atom, a hydrocarbon group, a heterocyclic compound residue, an oxygen-containing group, a sulfur-containing group, a nitrogen-containing group, a boron-containing group, an aluminum-containing group, a phosphorus-containing group, a halogen-containing group, a silicon-containing group, a germanium-containing group, and a tin-containing group; Q represents a group selected from the group consisting of boron, carbon, silicon, germanium, tin, and lead; $Pz^1$ represents a pyrazolyl group substituted, at least the position-3, with an unsubstituted or substituted aryl group, an alkyl group having three or more carbon atoms, a cycloalkyl group, an amino group, a hydrocarbyloxy group, or the like; $Pz^2$ represents an unsubstituted or substituted pyrazolyl group; i represents an integer of 1 to 3; M represents a transition metal atom selected from elements in Groups 3 to 11 of the periodic table; Y represents a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group; Z represents a neutral ligand having an electron-donating group; m is a number satisfying the valence of M, and when m is 2 or greater, a plurality of atoms or groups represented by Y may be the same or different from each other and any of the plurality of groups represented by Y may bond to each other to form (a) ring(s); and n represents an integer of 0 to 3.]

Step 1 in the present invention is polymerization of ethylene alone or ethylene with one or more monomers selected from α-olefins having 3 to 10 carbon atoms and cycloolefins, preferably ethylene alone, ethylene with an α-olefin having 3 to 10 carbon atoms, or ethylene with a cycloolefin. The content of monomers constituting the polymer is more preferably 90 to 100 mol % of ethylene and 0 to 10 mol % of an α-olefin or cycloolefin.

The α-olefin having 3 to 10 carbon atoms to be used includes propylene, 1-butene, 3-methyl-1-butene, 1-pentene, 3-methyl-1-butene, 1-hexene, 4-methyl-1-pentene, 3-methyl-1-pentene, 1-octene, 1-decene, and others, among which, propylene and butene are especially preferred. The cycloolefin includes cyclopentene, cycloheptene, norbornene, 5-methyl-2-norbornene, tetracyclododecene, 2-methyl-1,4,5,8-dimethano-1,2,3,4,4a,5,8,8a-octahydronaphthalene, and others.

Explanation is given on the polymerization catalyst component used for manufacturing the ethylene-based polymer microparticles containing aluminum at the polymer chain end in Step 1 according to the present invention.

The polymerization catalyst component used for manufacturing the ethylene-based polymer microparticles containing aluminum at the polymer chain end of the present invention comprises:

a solid catalyst component wherein the specific transition metal compound represented by general formula (7) or (8) below is supported on (A') magnesium-containing microparticles of the present invention, and (D') organometallic compound.

"Supported" in the present invention means the state where, the transition metal compound represented by general formula (7) or (8) is dissolved only 1 wt % or less of each compound after agitating at room temperature in at least one solvent chosen from hexane, decane, and toluene under atmospheric pressure for 1 minute to 1 hour.

Next, the above method is specifically explained.

Magnesium-containing Carrier Component (A')

The magnesium-containing carrier component (A') used for manufacturing the ethylene-based polymer microparticles of the present invention is the same as the magnesium-containing carrier component (A') used for manufacturing the above ethylene-based polymer microparticles.

Specific Transition Metal Compound

The transition metal compound used for manufacturing the ethylene-based polymer microparticles containing aluminum at the polymer chain end of the present invention is the compound represented by general formula (7) below:

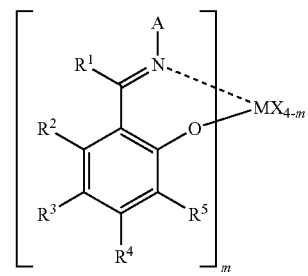

(7)

[In the formula, M represents Zr or Hf, m represents an integer of 1 or 2, A represents a saturated or unsaturated six-membered cyclic hydrocarbon group having one or more alkyl substituents in position-2, $R^1$ to $R^5$ may be the same or different from each other and each represent a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group, or a tin-containing group, and two or more of them may link to each other to form (a) ring(s), and when m is 2, two of groups represented by $R^1$ to $R^5$ may link to each other (however, two $R^1$s should not link to each other). (4-m) is the number satisfying the valence of M, X represents a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group. When m is 2 or greater, a plurality of groups represented by X may be the same or different from each other, and two or more groups represented by X may link to each other to form (a) ring(s).]

Specific, but non-limiting, examples of transition metal compound represented by general formula (7) are shown below.

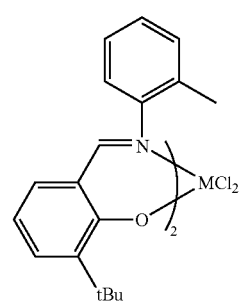

-continued
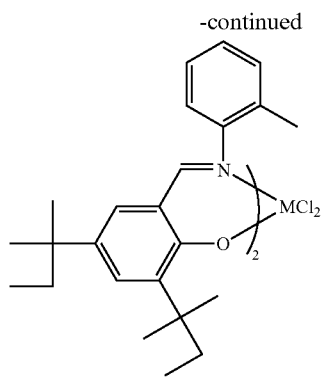
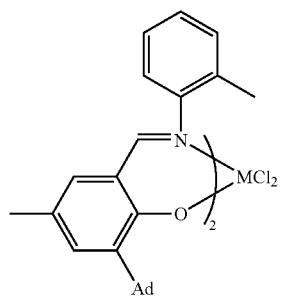
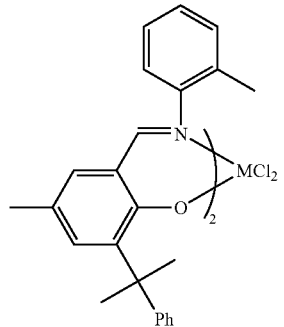
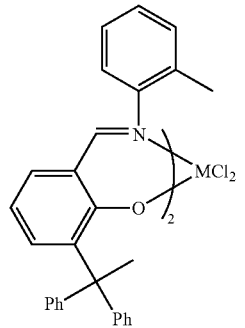
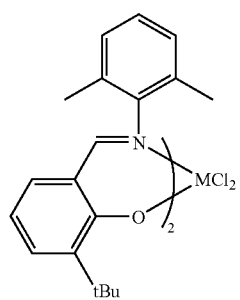
-continued
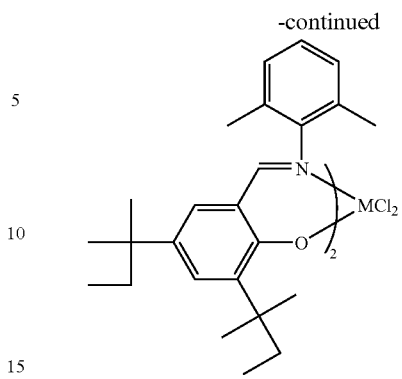
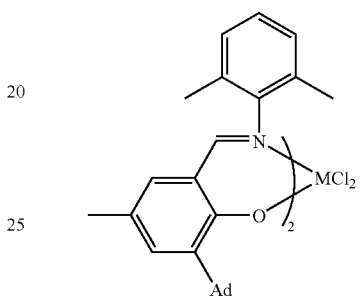
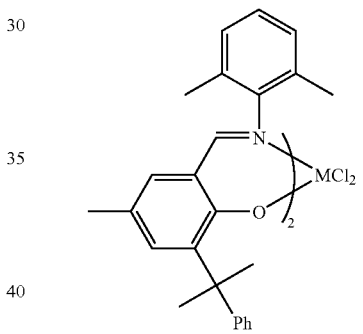
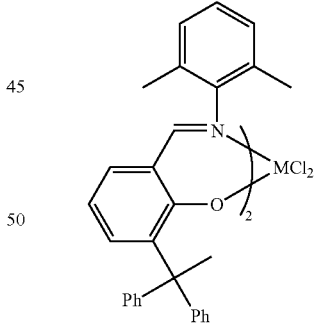
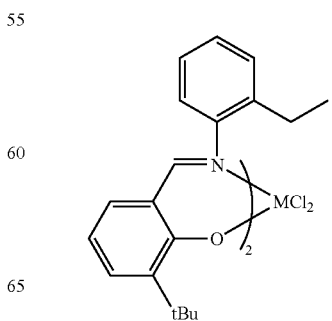

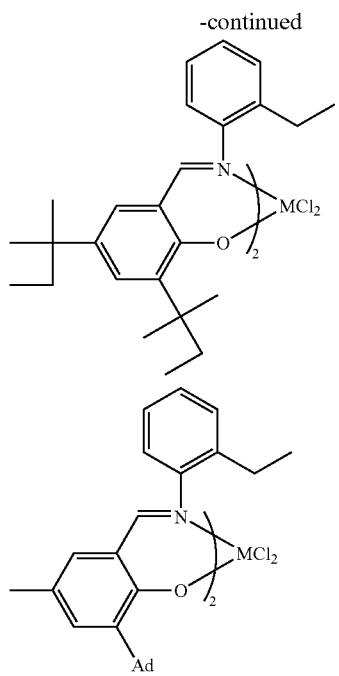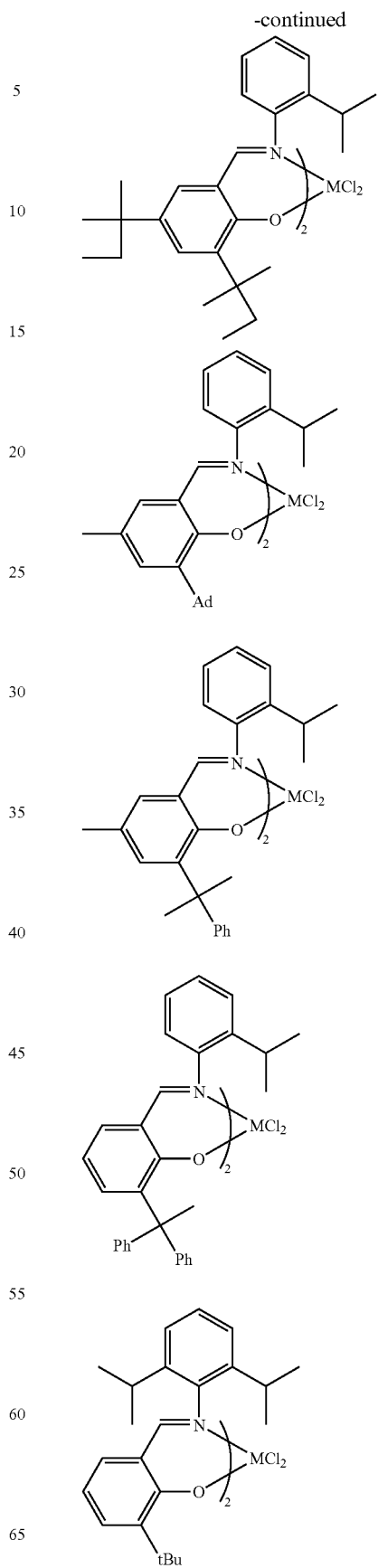

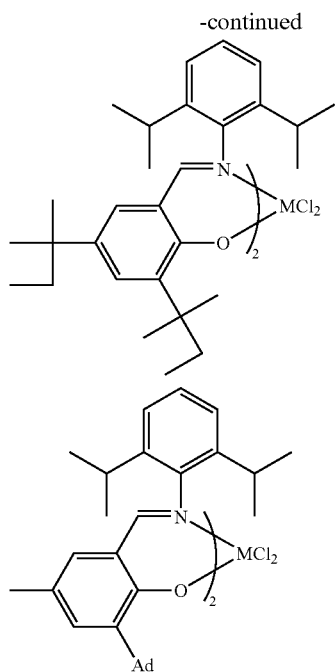
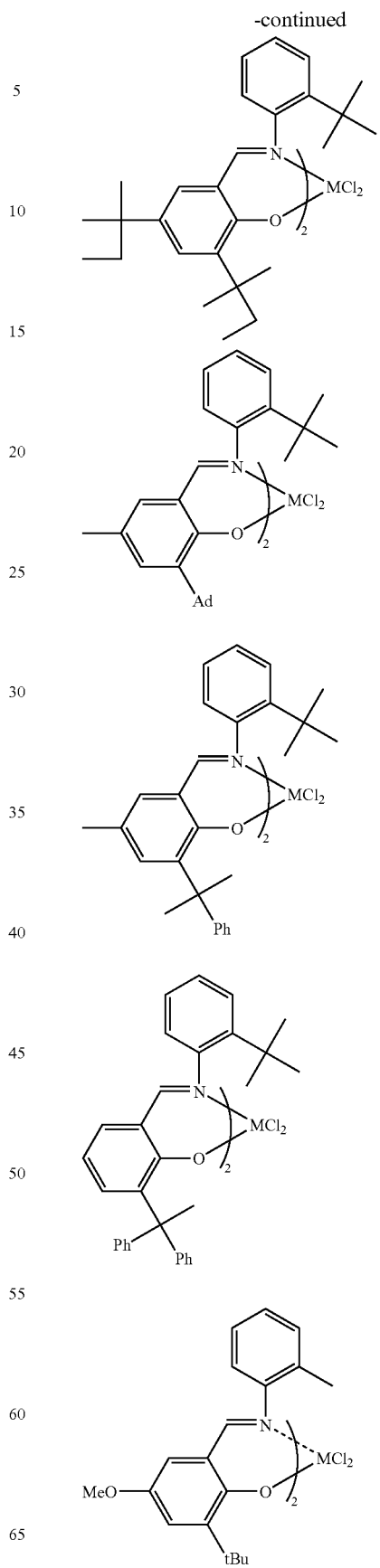

-continued
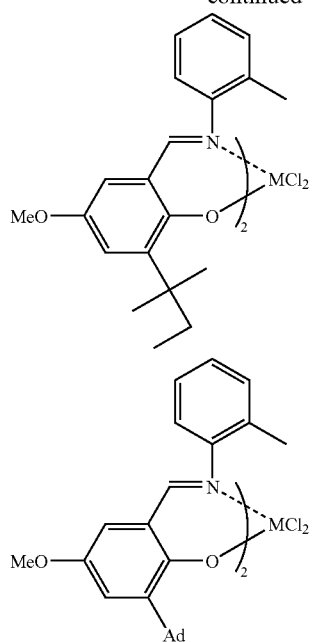
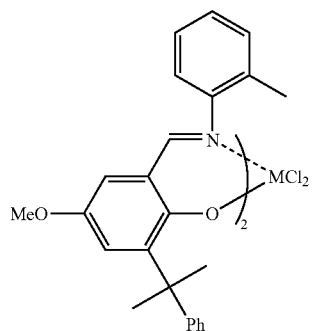
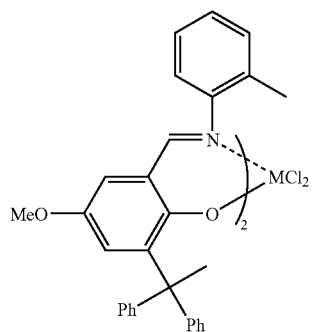
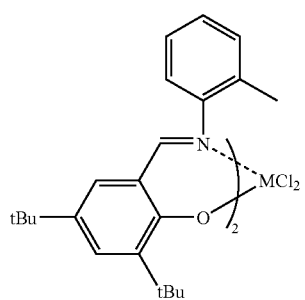
-continued
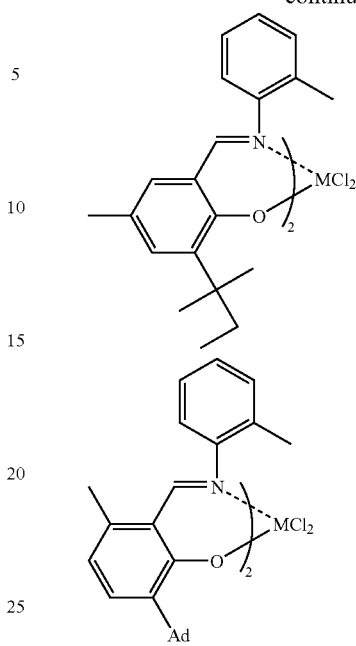
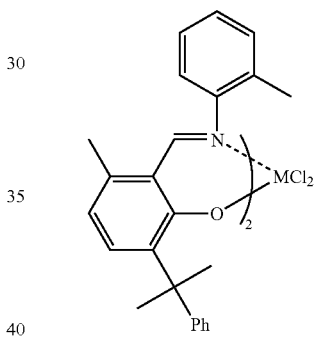
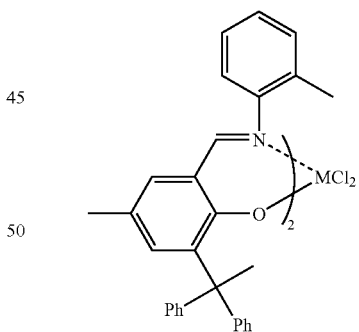
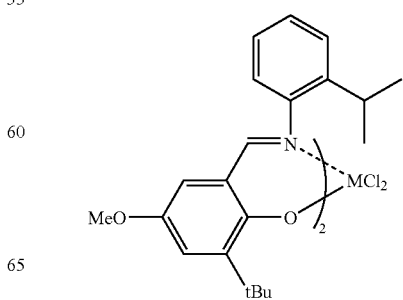

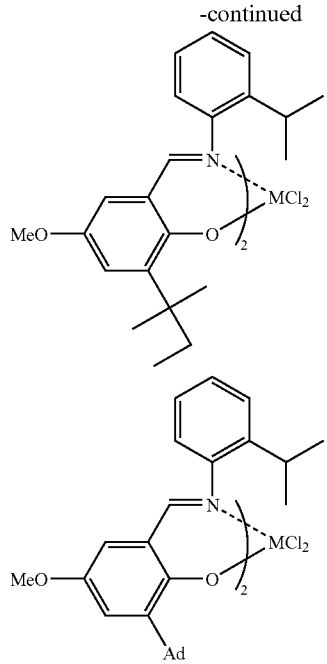
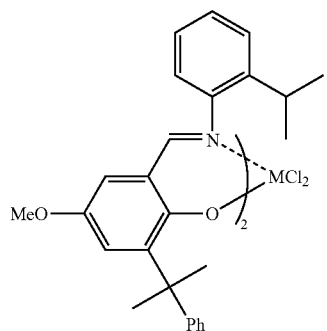
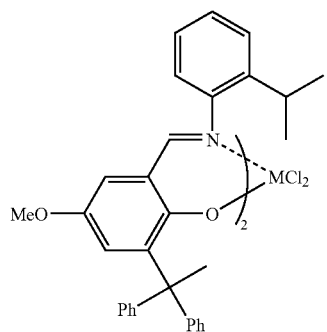
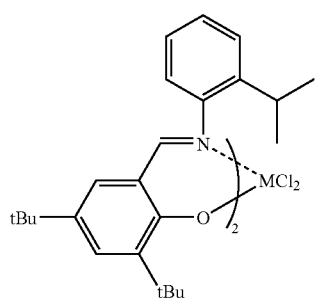
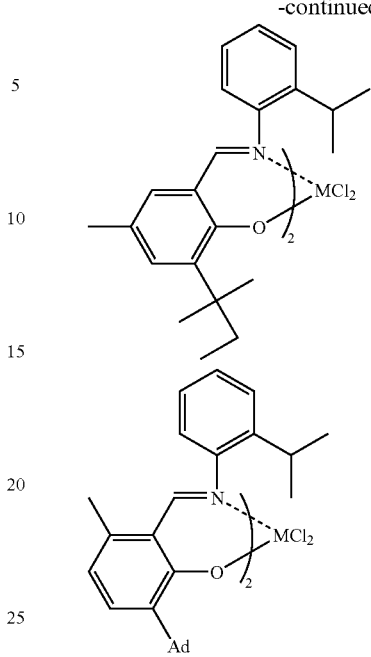
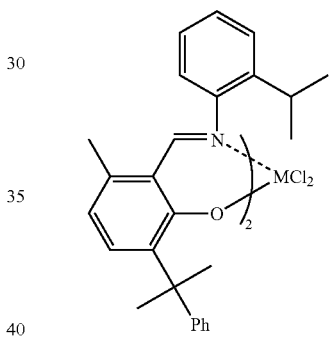
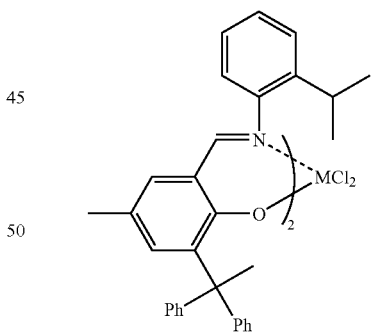
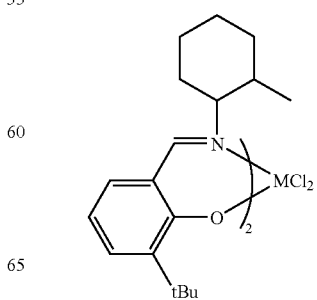

-continued
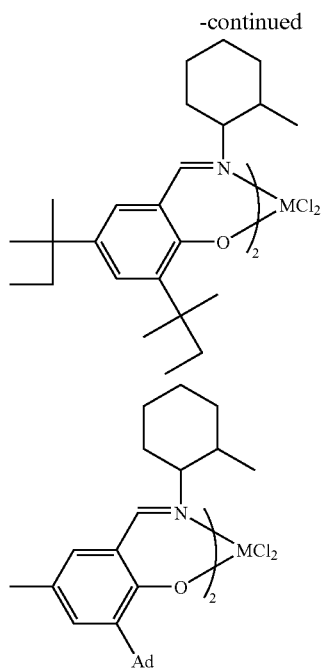
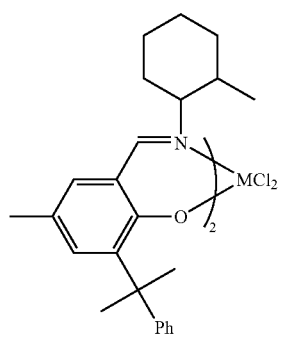
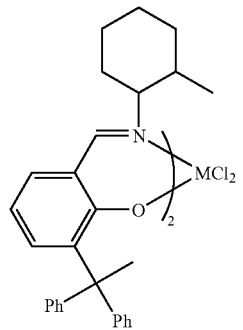
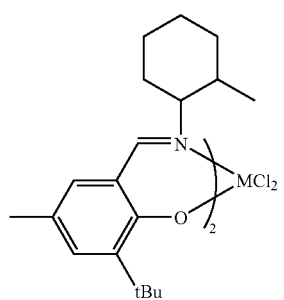
-continued
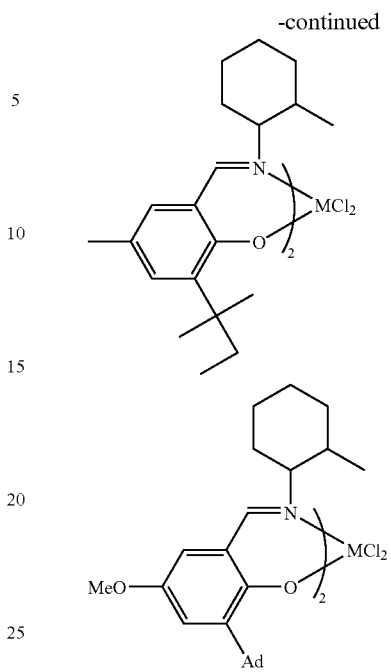
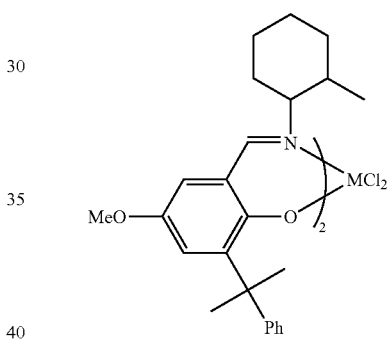
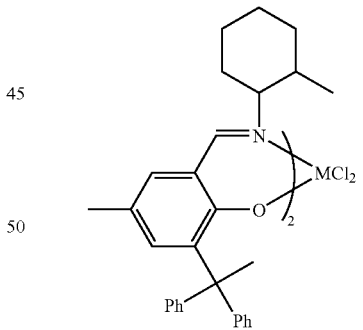
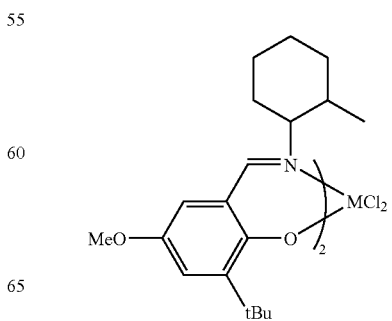

-continued

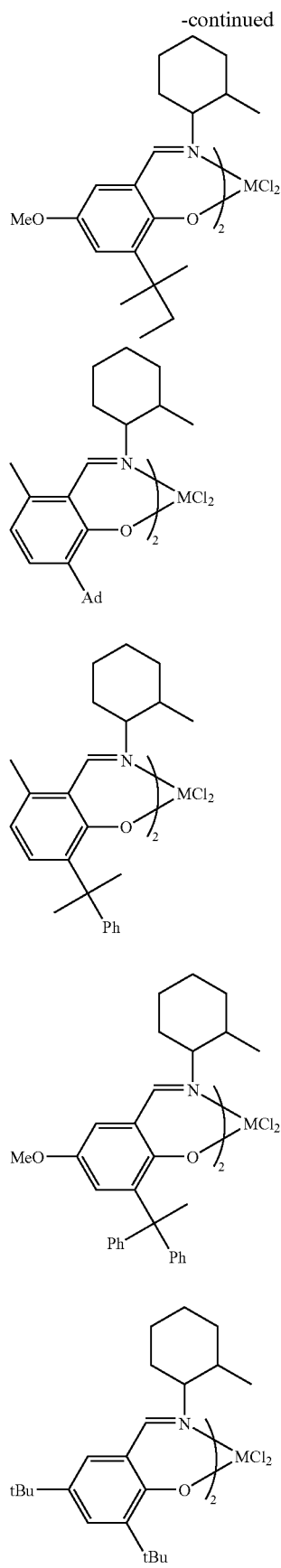

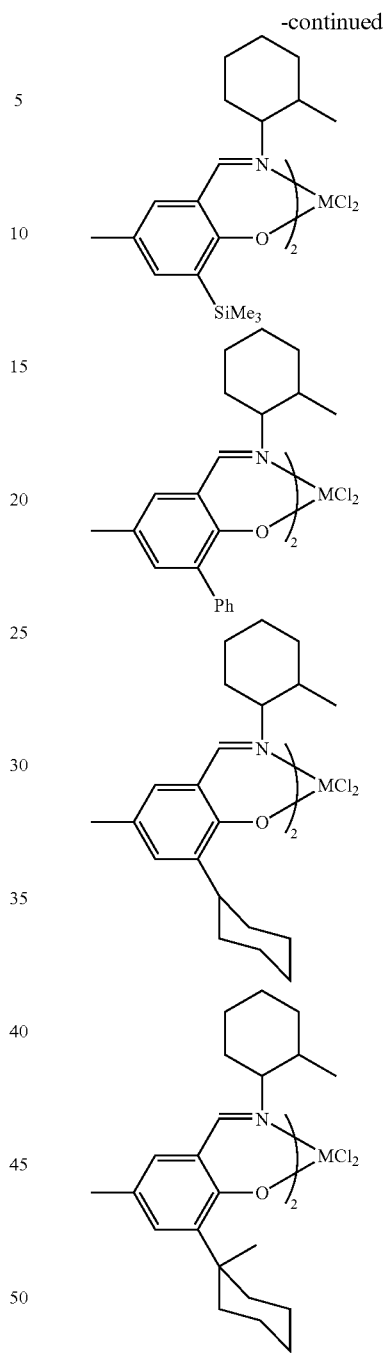

In the formulae, M represents Zr or Hf, and Ad represents adamantyl group.

The transition metal compound used for manufacturing the ethylene-based polymer microparticles containing aluminum at the polymer chain end of the present invention may be a compound represented by general formula (8) below:

$$RQ(Pz^1)_i(Pz^2)_{3-i}MY_mZ_n \qquad (8)$$

In general formula (8), R represents a group selected from the group consisting of a hydrogen atom, a halogen atom, a hydrocarbon group, a heterocyclic compound residue, an oxygen-containing group, a sulfur-containing group, a nitrogen-containing group, a boron-containing group, an aluminum-containing group, a phosphorus-containing group, a halogen-containing group, a silicon-containing group, a germanium-containing group, and a tin-containing group. As the halogen atom, hydrocarbon group, heterocyclic compound residue, oxygen-containing group, sulfur-containing group, nitrogen-containing group, boron-containing group, aluminum-containing group, phosphorus-containing group, halogen-containing group, silicon-containing group, germanium-containing group, and tin-containing group, there may be mentioned the groups listed in explanation of X in general formula (7).

In general formula (8), Q represents a tetravalent group selected from the group consisting of boron, carbon, silicon, germanium, tin, and lead; and boron, carbon, and silicon are particularly preferred.

In general formula (8), $Pz^1$ represents a pyrazolyl group substituted, at least position-3, with an unsubstituted or substituted aryl group, an alkyl group having three or more carbon atoms, a cycloalkyl group, an amino group, or a hydrocarbyloxy group. The unsubstituted aryl group includes phenyl, naphthyl, fluorenyl, and others. The substituted aryl includes a compound in which one or more ring-hydrogens in the above unsubstituted aryl group are substituted with an alkyl, aryl, or aralkyl group having 1 to 20 carbon atoms. $Pz^1$ is preferably substituted in position-3 with a 2,4,6-trimethylphenyl, 2,4,6-triisopropylphenyl, 2,3,4,5,6-pentamethylphenyl, or 4-tert-butyl-2,6-dimethylphenyl group, and especially preferably substituted in position-3 with a 2,4,6-trimethylphenyl group.

$Pz^2$ represents an unsubstituted or substituted pyrazolyl group. The substituted pyrazolyl group may be the same as $Pz^1$ described above and may be further substituted in any position other than position-3 with a group illustrated as a substitutent in the above substituted aryl group.

In general formula (8), M represents a transition metal atom selected from Groups 3 to 11 of the periodic table, and specifically, it is a metal atom in Group-3 including scandium, yttrium, lanthanides, and actinides; metal atom in Group-4 including titanium, zirconium, and hafnium; metal atom in Group-5 including vanadium, niobium, and tantalum; metal atom in Group-6 including chromium, molybdenum, and tungsten; metal atom in Group-7 including manganese, technetium, and rhenium; metal atom in Group-8 including iron, ruthenium, and osmium; metal atom in Group-9 including cobalt, rhodium, and iridium; metal atom in Group-10 including nickel, palladium, and platinum; or metal atom in Group-11 including copper, silver, and gold. Among these, preferred are metal atoms in Groups 3, 4, 5, and 6; in particular, yttrium, titanium, zirconium, hafnium, vanadium, chromium, and the like. More preferably, transition metal atom M is a transition metal atom in Group-4 or Group-5 in valence state of 2, 3, or 4. Titanium, zirconium, hafnium, and vanadium are especially preferred. When transition metal atom M is titanium or vanadium, trivalent state is especially preferred.

Y represents a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin containing; Z represents a neutral ligand having an electron-donating group; and m represents the number satisfying the valence of M. When m is 2 or greater, a plurality of atoms or groups represented by Y may be the same or different from each other and any of plurality of groups represented by Y may bond to each other to form (a) ring(s). n represents an integer of 0 to 3.

When Y is an oxygen atom, M and Y bond via a double bond.

m is the number satisfying the valence of M and determined according to the charge of transition metal atom M and that of Y so that these positive/negative valences are cancelled. Provided the absolute value of valences of transition metal atom M is a and the absolute value of valence of Y is b, the relationship, a-2=b×m, is established. More specifically, for example, when M is $Ti^{4+}$ and X is $Cl^-$, m is 2.

In general formula (8), Z represents a neutral ligand having an electron-donating group. n, which represents the number of Z, is an integer of 0 to 3 and preferably 1 or 2. The electron-donating group refers to a group that can donate an unshared electron-pair to metal. Z may be any electron-donating neutral ligand, and specifically it includes, for example, linear or cyclic, saturated or unsaturated ethers such as diethyl ether, dimethyl ether, diisopropyl ether, tetrahydrofuran, furan, dimethylfuran, anisole, diphenyl ether, and methyl t-butyl ether; linear or cyclic, saturated or unsaturated aldehydes such as acetaldehyde, propionaldehyde, n-butyraldehyde, benzaldehyde, p-nitrobenzaldehyde, p-tolualdehyde, and phenylacetaldehyde; linear or cyclic, saturated or unsaturated ketones such as acetone, methyl ethyl ketone, methyl n-propyl ketone, acetophenone, benzophenone, n-butyrophenone, and benzyl methyl ketone; linear or cyclic, saturated or unsaturated amides such as formamide, acetamide, benzamide, n-valeramide, stearamide, N,N-dimethylformamide, N,N-dimethylacetamide, N,N-diethylpropionamide, and N,N-dimethyl-n-butyramide; linear or cyclic, saturated or unsaturated anhydrides such as acetic anhydride, succinic anhydride, and maleic anhydride; linear or cyclic, saturated or unsaturated imides such as succinimide and phthalimide; linear or cyclic, saturated or unsaturated esters such as methyl acetate, ethyl acetate, benzyl acetate, phenyl acetate, ethyl formate, ethyl propionate, ethyl stearate, and ethyl benzoate; linear or cyclic, saturated or unsaturated amines such as trimethylamine, triethylamine, triphenylamine, dimethylamine, aniline, pyrrolidine, piperidine, and morpholine; nitrogen-containing heterocyclic compounds such as pyridine, α-picoline, β-picoline, quinoline, isoquinoline, 2-methylpyridine, pyrrole, oxazole, imidazole, pyrazole, and indole; sulfur-containing heterocyclic compounds such as thiophene and thiazole; phosphines such as trimethylphosphine, triethylphosphine, tn-n-butylphosphine, and triphenylphosphine; saturated or unsaturated nitriles such as acetonitrile and benzonitrile; inorganic salts such as lithium chloride, sodium chloride, potassium chloride, magnesium chloride, and calcium chloride; inorganic compounds such as carbon monoxide and carbon dioxide; and organometallic compound (D') described above; and others. Z may be a compound in which a part of these compounds has been substituted with a substituent such as an alkyl group, halogen group, nitro group, carbonyl group, and amino group. Among these neutral ligands, ethers, aldehydes, ketones, nitrogen-containing heterocyclic compounds, and inorganic salts are preferred as Z in formula (8).

In general formula (8), i is an integer of 1 to 3 and preferably 2 or 3.

In the present invention, among the specific transition metal compounds satisfying the above requirements, especially preferred are [hydrobis(3-mesitylpyrazol-1-yl)](5-mesitylpyrazol-1-yl)borate zirconium trichloride and [hydrotris(3-mesitylpyrazol-1-yl)]borate zirconium trichloride.

The transition metal compound may form a complex, such as dimer, trimer, or oligomer, through such a neutral ligand, or it may form a bridged structure such as μ-oxo compound through such a neutral ligand.

(D') Organometallic Compound

Organometallic compound (D') used for manufacturing the ethylene-based polymer microparticles containing aluminum at the polymer chain end of the present invention is the same as the above organometallic compound (D') used for manufacturing ethylene-based polymer microparticles. Particularly, it is preferably represented by general formula (6-1).

The functional group-containing ethylene-based polymer microparticles obtained by the fifth method of the present invention can be manufactured in Step 2, which is a reaction of a polymer with an oxygen-containing compound, halogen-containing compound, nitrogen-containing compound, or sulfur-containing compound, wherein the polymer has been obtained, using the above polymerization catalyst component for manufacturing ethylene-based polymer microparticles containing aluminum at the polymer chain end, similarly to the ethylene-based polymer microparticles of the present invention.

The oxygen-containing compound used for reaction with polyolefin containing aluminum at the polymer chain end includes oxygen, ethylene oxide, propylene oxide, and others, and it is preferably oxygen. Reaction is conducted in inert gas atmosphere in a hydrocarbon solvent at 0° C. to 150° C., by introducing dried oxygen or air into a solution or slurry of polyolefin containing aluminum at the polymer chain end. This reaction yields terminal hydroxylated polyolefin. Chlorine, bromine, or iodine is used as a halogen compound. The reaction is conducted in a hydrocarbon or halogenated hydrocarbon solvent at 0° C. to 150° C. in the presence of a base such as pyridine in inert gas atmosphere, by introducing a halogen compound directly into a solution or slurry of polyolefin containing aluminum at the polymer chain end.

In manufacturing the functional group-containing ethylene-based polymer microparticles of the present invention, it is preferred to remove inorganic substances from a product like the above ethylene-based polymer microparticles.

When a polymer is obtained by conducting slurry polymerization, gas-phase polymerization, or others using the magnesium-containing microparticles of the present invention, which have spherical shape, small particle diameter, and narrow particle size distribution, as a carrier in the solid catalyst component of the polymerization catalyst, the resultant polymer, i.e. ethylene-based polymer microparticles, also has small particle diameter, narrow particle size distribution, spherical shape, and good flowability. Moreover, the functional group-containing ethylene-based polymer microparticles obtained by modifying the manufactured polymer also have small particle diameter, narrow particle size distribution, spherical shape, and good flowability.

For the molded article of the present invention, the ethylene-based polymer microparticles or functional group-containing ethylene-based polymer microparticles of the present invention are molded into desired shape without deteriorating properties, such as small particle diameter, narrow particle size distribution, absence of inter-particle agglomeration, and high sphericity, to provide molded articles with such outstanding characteristics. The molding method is not particularly restricted. Various molding methods known conventionally may be applied. For example, molded articles with desired shape can be obtained by injection molding, extrusion molding, or press molding. According to the required property of molded article, another resin may be used together, or various additives may also be mixed when molded.

As the molded article obtained by molding the ethylene-based polymer microparticles or functional group-containing ethylene-based polymer microparticles of the present invention, there may be mentioned, as examples, light diffusive films, electronic book base, separator members in lithium batteries or lithium-ion secondary batteries, optical filter members, members for electronic papers, pore-forming material for breathable films, and sintered filters.

The ethylene-based polymer microparticles and functional group-containing ethylene-based polymer microparticles of the present invention can be suitably used as ultraviolet absorbers, antioxidants, anti-blocking agents, material for cosmetics (foundation), resin modifiers, lubricating agents, toner, delusterants for paint, additives for light diffusion, insulating fillers, nucleating agents for crystallization, fillers for chromatography, carriers for immunodiagnostic agents, spacer materials for making cell-gap of flat panel display, and catalyst carriers.

Furthermore, since the ethylene-based polymer microparticles and functional group-containing ethylene-based polymer microparticles of the present invention have small particle diameter, narrow particle size distribution, and high sphericity, they can provide a sintered body serving as a porous body with small pore size and uniform pore size, that is, with narrow pore size distribution. This sintered body can be preferably used as a filter for industrial water and for filtration of potable water, juice, wine, liquors, and others.

Moreover, when a sintered body is manufactured using the functional group-containing ethylene-based polymer microparticles of the present invention, the sintered body need not be modified after manufacture, and a uniformly modified sintered body can be obtained.

EXAMPLES

Hereafter, the present invention is explained more specifically with Examples, though the present invention is not limited to these Examples.

Synthetic Example 1

Preparation of Component (B1)

Reaction was conducted with 95.2 g (1.0 mol) of anhydrous magnesium chloride, 442 ml of decane, and 390.6 g (3.0 mol) of 2-ethylhexyl alcohol at 130° C. for 2 hours to obtain a homogeneous solution (component (B1)).

Preparation of Mg-containing Carrier Component (B1-1)

A fully nitrogen-purged flask with inner volume of 1000 ml was charged with 50 ml (50 mmol in terms of magnesium atom) of component (B1), 283 ml of purified decane, and 117 ml of chlorobenzene. While the solution was stirred at a revolution speed of 15000 rpm using a Clear Mix CLM-0.8S (Organo Corp.) and the temperature was kept at 0° C., here was added 52 mmol of triethylaluminum diluted with purified decane dropwise over 30 minutes. The temperature was gradually increased to 80° C. in 5 hours, and reaction was conducted for 1 hour. Subsequently, while the temperature was kept at 80° C., 98 mmol of triethylaluminum diluted with purified decane was again added dropwise over 30 minutes, and the reaction was continued with heating for another 1 hour. When the reaction completed, solid was collected by filtration, thoroughly washed with toluene, and suspended in 100 ml of toluene to obtain toluene slurry of Mg-containing carrier component (B1-1). The average particle diameter of obtained Mg-containing carrier component (B1-1) was 1.5 µm. The median diameter ($d_{50}$) was 1.45 µm, and the Cv value was 10.0%.

A part of Mg-containing carrier component (B1-1) prepared by the above operation was dried for composition analysis, which showed that magnesium was 19.0 wt %, aluminum was 2.9 wt %, 2-ethylhexoxy group was 21.0 wt %, chlorine was 53.0 wt %, the molar ratio of magnesium to aluminum (Mg/Al) was 7.3, and the molar ratio of 2-ethylhexoxy group to aluminum (2-ethylhexoxy/Al) was 1.5.

Synthetic Example 2

Synthesis of Solid Catalyst Component B1-1-A2-126

A nitrogen-purged 200-ml glass reactor was charged with 63 ml of toluene, and here was added 12 ml (6 mmol in terms of Mg atom) of toluene slurry of Mg-containing carrier component (B1-1) prepared above with stirring. Then, 20.0 ml of toluene solution of transition metal compound (A2-126) below (0.00075 mmol/ml in terms of Zr atom) was added dropwise over 10 minutes, and the reaction was conducted at room temperature for 1 hour. The reaction mixture was filtered, and the solid was washed with toluene (50 ml×3) and decane (50 ml×2) and suspended in 100 ml of decane to prepare decane slurry of solid catalyst component (B1-1-A2-126). With a part of the obtained slurry of solid catalyst component (B1-1-A2-126), the concentrations were determined to be 0.000117 mmol/ml for Zr, 0.0518 mmol/ml for Mg, and 0.00726 mmol/ml for Al.

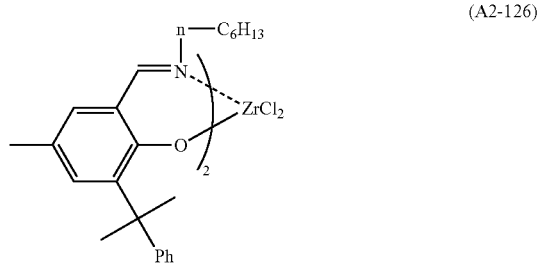

(A2-126)

Synthetic Example 3

Preparation of Solid Catalyst Component (B1-1-A2-172I)

A fully nitrogen-purged flask with inner volume of 1000 ml was charged with Mg-containing carrier component (B1-1) in an amount of 20 mmol in terms of magnesium atom and 600 ml of purified toluene. While this suspension was stirred and kept at room temperature, here was added 20 ml of toluene solution (0.0001 mmol/ml) of transition metal compound (A2-172) below dropwise over 20 minutes. After the resultant mixture was stirred for 1 hour, solid was collected by filtration, washed well with toluene, and suspended in purified decane to obtain 200 ml of decane slurry of solid catalyst component (B1-1-A2-172I).

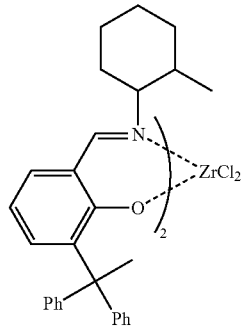

(A2-172)

Synthetic Example 4

Preparation of Solid Catalyst Component (B1-1-A2-172II)

A fully nitrogen-purged flask with inner volume of 400 ml was charged with Mg-containing carrier component (B1-1) in an amount of 5 mmol in terms of magnesium atom and 170 ml of purified toluene. While this suspension was stirred and kept at room temperature, here was added 20 ml of the above toluene solution (0.0005 mmol/ml) of compound (A2-172) dropwise over 20 minutes. After the mixture was stirred for 1 hour, solid was collected by filtration, washed well with toluene, and suspended in purified decane to obtain 100 ml of decane slurry of solid catalyst component (B1-1-A2-172II).

Synthetic Example 5

Preparation of Solid Catalyst Component (B1-1-A2-60)

A nitrogen-purged 200-ml glass reactor was charged with 63 ml of toluene, and with stirring, 12 ml (6 mmol in terms of Mg atom) of the toluene slurry of Mg-containing carrier component (B1-1) prepared above was added. Then 20.0 ml of toluene solution (0.75 mmol/ml in terms of Zr atom) of transition metal compound (A2-60) below dropwise over 10 minutes, and the reaction was conducted at room temperature for 1 hour. The reaction mixture was filtered, the solid was washed with toluene (50 ml×3) and decane (50 ml×2), and suspended in 100 ml of decane to prepare decane slurry of solid catalyst component (B1-1-A2-60). With a part of the obtained slurry of solid catalyst component (B1-1-A2-60), the concentrations were determined to be 0.000125 mmol/ml for Zr, 0.0531 mmol/ml for Mg, and 0.00745 mmol/ml for Al.

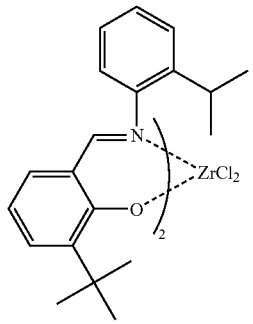

(A2-60)

Synthetic Example 6

Preparation of Mg-Containing Carrier Component (B1-2)

A fully nitrogen-purged flask with inner volume of 1400 ml was charged with 100 ml (100 mmol in terms of magnesium atom) of component (B1), 50 ml of purified decane, and 560 ml of chlorobenzene. While this mixture was stirred at revolution speed of 20000 rpm using Clear Mix CLM-1.5S (Tokushu Kika Kogyo Co., Ltd.) and kept at 0° C., there was added 110 mmol of triethylaluminum diluted with purified decane dropwise over 30 minutes. Then, the temperature of liquid was gradually increased to 80° C. in 5 hours, and the reaction was conducted with heating for 1 hour. Subsequently, while the temperature was kept at 80° C., 202 mmol of triethylaluminum diluted with purified decane was again added dropwise over 30 minutes, and the reaction was continued with heating for another 1 hour. When the reaction completed, solid was collected by filtration, washed well with purified toluene, and suspended in purified toluene to obtain 300 ml of toluene slurry of Mg-containing carrier component (B1-2). The median diameter ($d_{50}$) of obtained Mg-containing carrier component (B1-2) was 0.95 μm, and the Cv value was 10.1%.

A part of Mg-containing carrier component (B1-2) prepared by the above operation was dried for composition analysis, which indicated that magnesium was 18.0 wt %, aluminum was 2.9 wt %, 2-ethylhexoxy group was 21.0 wt %, chlorine was 53.0 wt %, the molar ratio of magnesium to aluminum (Mg/Al) was 6.9, and the molar ratio of 2-ethylhexoxy group to aluminum (2-ethylhexoxy/Al) was 1.6.

Synthetic Example 7

Synthesis of Solid Catalyst Component (B1-2-A2-126)

A fully nitrogen-purged glass reactor with inner volume of 200 ml was charged with 96 ml of purified toluene, and here was added, with stirring, 12 ml (4 mmol in terms of Mg atom) of toluene slurry of Mg-containing carrier component (B1-2) prepared above. Next, 20.0 ml of toluene solution of transition metal compound (A2-126) below (0.0005 mmol/ml in terms of Zr atom) was added dropwise over 10 minutes, and the reaction was conducted at room temperature for 1 hour. The reaction mixture was filtered, and the solid was washed with purified toluene (100 ml×3) and purified decane (100 ml×2), and suspended in purified decane to prepare 100 ml of decane slurry of solid catalyst component (B1-2-A2-126).

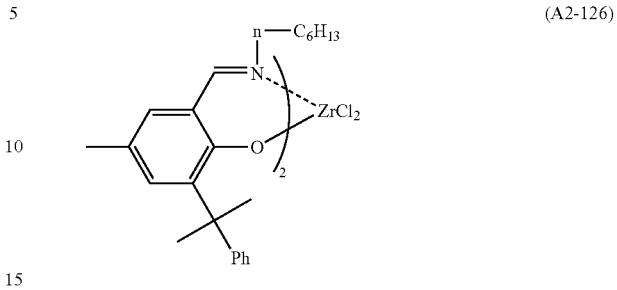

(A2-126)

Synthetic Example 8

Preparation of Solid Catalyst Component (B1-2-A2-172)

A fully nitrogen-purged glass reactor with inner volume of 200 ml was charged with 85 ml of purified toluene, and here was added, with stirring, 45 ml (15 mmol in terms of Mg atom) of toluene slurry of Mg-containing carrier component (B1-2) prepared above. Next, 20.0 ml of toluene solution of transition metal compound (A2-172) (0.00015 mmol/ml in terms of Zr atom) was added dropwise over 15 minutes, and the reaction was conducted at room temperature for 1 hour. The reaction mixture was filtered, and the solid was washed with purified toluene (150 ml×3) and purified decane (150 ml×2) and suspended to purified decane to prepare 200 ml of decane slurry of solid catalyst component (B1-2-A2-172).

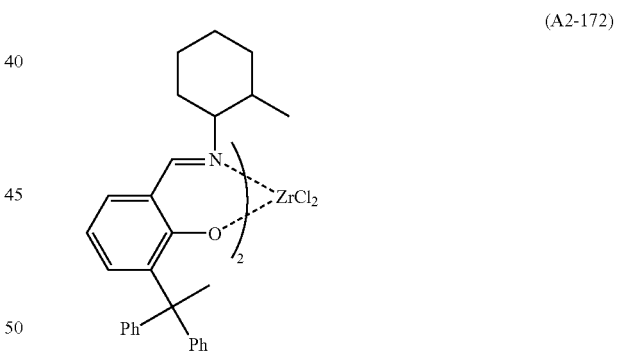

(A2-172)

Synthetic Example 9

Preparation of solid catalyst component (B1-1-TP$^{M}$-$_{s}$Zr(IV)Cl$_3$)

Except changing the transition metal compound to TP$^{MS}$Zr(IV)Cl$_3$, the same procedures as those in Synthetic Example 5 were performed to obtain solid catalyst component (B1-1-TP$^{MS}$Zr(IV)Cl$_3$) Composition analysis using a part of this slurry indicated that Zr concentration was 0.000135 mmol/ml, Mg concentration was 0.0542 mmol/ml, and Al concentration was 0.00756 mmol/ml. Here, Ms in TP$^{MS}$Zr(IV)Cl$_3$ represents "mesityl group."

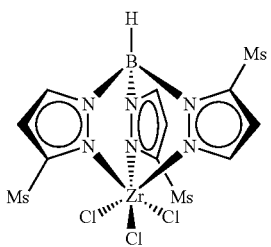

(TP$^{MS}$Zr(IV)Cl$_3$)

Example 1

To a fully nitrogen-purged stainless steel autoclave with inner volume of 1000 ml, 500 ml of heptane was charged, and ethylene was flowed therein in 100 l/hr at room temperature for 15 minutes to saturate the liquid and gas phases. After the temperature was increased to 50° C., there were added, under 12 l/hr of ethylene stream, 1.0 ml of decane solution of tri-n-octylaluminum (0.5 mmol/ml in terms of Al atom) and 8.55 ml (0.001 mmol in terms of Zr atom) of solid catalyst component (B1-1-A2-126), and the mixture was stirred for 3 minutes with the temperature maintained. Then, the pressure of ethylene was started increasing and raised to 0.8 MPaG over 10 minutes while the temperature was kept at 50° C. Polymerization was performed for 1 hour supplying ethylene so as to maintain the pressure at 0.8 MPaG. Then, the autoclave was cooled and ethylene pressure was released. The obtained polymer slurry was filtered, and the solid was washed with hexane and dried under reduced pressure at 80° C. for 10 hours to obtain 10.24 g of polymer. The vinyl content in the polymer was 1.34/1000 carbon atoms as determined by infrared spectrophotometry. The intrinsic viscosity [η] was 1.72 dl/g. Preliminary observation of the particle diameter of produced polymer on a microscope (Keyence Corp.) indicated the average particle diameter was 8.9 μm. The median diameter ($d_{50}$) was 9.5 μm, and the Cv value was 14.0%. 100% of the particles passed through a 37-μm mesh screen. The infrared absorption spectrum after treatment with methanol completely coincided with the spectrum before treatment. The circularity coefficient of produced particles was 0.93 as determined from the two-dimensional image.

Example 2

To a fully nitrogen-purged stainless steel autoclave with inner volume of 1000 ml, 500 ml of heptane was charged, and 100 l/hr of ethylene was flowed therein at room temperature for 15 minutes to saturate the liquid and gas phases. After raising the temperature to 50° C., there were added, under 12 l/hr of ethylene stream, 0.5 ml of decane solution of tri-n-octylaluminum (0.5 mmol/ml in terms of Al atom) and 8.55 ml (0.001 mmol in terms of Zr atom) of solid catalyst component (B1-1-A2-126), and the mixture was stirred for 3 minutes with the temperature maintained at 50° C. Immediately after 3.3 mg of Emulgen E-108 (Kao Corp.) was added, the pressure of ethylene was started raising and increased to 0.78 MPaG over 10 minutes while the temperature was kept at 50° C. Polymerization was performed for 1 hour supplying ethylene so as to maintain the pressure at 0.78 MPaG. Then, the autoclave was cooled and ethylene pressure was released. Under nitrogen atmosphere, the resultant slurry was discharged and filtered, and the solid was resuspended in 200 ml of isobutyl alcohol to prepare slurry. Whole of the slurry was transferred to a fully nitrogen-purged glass reactor with inner volume of 0.5 l, 60 ml of acetylacetone was added here, and the mixture was heated at 85° C. with stirring for 1 hour. The reaction mixture was filtered, the solid was washed with isobutyl alcohol, methanol, and hexane, and dried in vacuum for 10 hours to obtain 8.35 g of polyethylene. The vinyl content in the polymer was 1.34/1000 carbon atoms as determined by infrared spectrophotometry. The intrinsic viscosity [η] was 1.70 dl/g. Preliminary observation of the particle diameter of produced polymer on a microscope (Keyence Corp.) indicated the average particle diameter was 8.5 μm. The median diameter ($d_{50}$) was 9.2 μm, and the Cv value was 13.5%. 100% of the particles passed through a 37-μm mesh screen. The infrared absorption spectrum after treatment with methanol completely coincided with the spectrum before treatment. The circularity coefficient of produced particles was 0.93 as determined from the two-dimensional image.

IR chart measured with infrared spectrophotometry is shown in FIG. 1.

Example 3

To a fully nitrogen-purged SUS autoclave with inner volume of 1 l, 500 ml of purified heptane was charged, and ethylene was flowed therein to saturate the liquid and gas phases. The temperature was raised to 48° C., and there were added, under ethylene atmosphere, 1.25 mmol of triethylaluminum, 4.5 ml of slurry of solid catalyst component (B1-1-A2-172I) prepared above, and 28.8 mg of Emulgen E-108 (Kao Crop.) in this order. The ethylene pressure was raised to 0.78 MPaG, and polymerization was conducted for 120 minutes. During polymerization, the temperature was kept at 50° C. and the ethylene pressure was maintained at 0.78 MPaG. After polymerization completed, under nitrogen atmosphere, the resultant slurry was discharged and filtered, the solid was resuspended in 200 ml of isobutyl alcohol to prepare slurry. Whole of the slurry was transferred to a fully nitrogen-purged glass reactor with inner volume of 0.5 l, 60 ml of acetylacetone was added there, and the mixture was heated at 100° C. with stirring for 1 hour. The reaction mixture was filtered, and the solid was washed with isobutyl alcohol, methanol, and hexane, the produced polymer was dried under vacuum for 10 hours to obtain 21.9 g of polyethylene. The polyethylene had a vinyl content of 0.03/1000 carbon atoms, which was determined by infrared spectrophotometry, [η] of 25.9 dl/g, a median diameter ($d_{50}$) of 12.1 μm, and Cv value of 13.8%. 100% of the particles passed through a 37-μm mesh screen. The infrared absorption spectrum after treatment with methanol completely coincided with the spectrum before treatment. The circularity coefficient of produced particles was 0.94 as determined from the two-dimensional image.

Example 4

To a fully nitrogen-purged SUS autoclave with inner volume of 1 l, 500 ml of purified heptane was charged, and ethylene was flowed therein to saturate the liquid and gas phases. The temperature was raised to 48° C., and there were added, under ethylene atmosphere, 1.25 mmol of triethylaluminum, 4.0 ml of slurry of solid catalyst component (B1-1-A2-172II) prepared above, and 25.6 mg of Emulgen 108 (Kao Corp.) in this order. The ethylene pressure was increased to 0.05 MPaG, and polymerization was conducted for 30 minutes, while the temperature was kept at 50° C. and the ethylene pressure was maintained at 0.05 MPaG. Afterward, the ethylene pressure was raised to 0.78 MPaG and polymerization was further continued for 40 minutes while the temperature was kept at 50° C. and the ethylene pressure was maintained at 0.78 MPaG. After polymerization, no polymer adhered to walls of the reactor or the stirring blade. The reaction product was washed with a large amount of hexane and collected by filtration through a glass filter. The produced polymer was dried under vacuum for 10 hours to obtain 59.0 g of polyethylene, which had [η] of 22.0 dl/g, a median-diameter ($d_{50}$) of 24.1 μm, and Cv value of 15.0%. 100% of the particles passed through a 37-μm mesh screen.

Example 5

To a fully nitrogen-purged SUS autoclave with inner volume of 1 l, 500 ml of purified heptane was charged, and ethylene was flowed therein to saturate the liquid and gas phases. The temperature was raised to 48° C., and there were added, under ethylene atmosphere, 1.25 mmol of triethylaluminum, 4.0 ml of slurry of solid catalyst component (B1-1-A2-172II) prepared above, and 25.6 mg of Emulgen 108 (Kao Crop.) in this order. The ethylene pressure was increased to 0.05 MPaG, and polymerization was conducted for 30 minutes while the temperature was kept at 50° C. and the ethylene pressure was maintained at 0.05 MPaG. Afterward, the ethylene pressure was raised to 0.78 MPaG and polymerization was further continued 30 minutes while the temperature was kept at 50° C. and the ethylene pressure was maintained at 0.78 MPaG. After polymerization, no polymer adhered to walls of the reactor or the stirring blade. The reaction product was washed with a large amount of hexane, collected by filtration through a glass filter, and dried under vacuum for 10 hours to obtain 37.2 g of polyethylene. In the obtained polyethylene, the vinyl content was 0.04/1000 carbon atoms as determined by infrared spectrophotometry, [η] was 22.0 dl/g, the median diameter ($d_{50}$) was 18.5 μm, and the Cv value was 15.0%. 100% of the particles passed through a 37-μm mesh screen. The infrared absorption spectrum after treatment with methanol completely coincided with the spectrum before treatment. The circularity coefficient of produced particles was 0.93 as determined from the two-dimensional image.

Example 6

A nitrogen-purged 300-ml glass flask was charged with 5.16 g of the vinyl group-containing polymer obtained in Example 2, 75 ml of methylene chloride, and 45 ml of saturated aqueous solution of sodium hydrogen carbonate, and here was added 30 ml of methylene chloride solutions of perbenzoic acid (70% of water content, 4.07 g) dropwise over 10 minutes with stirring. The reaction was continued at room temperature under nitrogen atmosphere for 80 hours. Then, 50 ml of water was added, the resultant mixture was stirred and filtered, and the solid was stirred in 30 ml of saturated aqueous solution of sodium thiosulfate and filtered. The solid was again stirred in 50 ml of water-methanol (1/1) mixture, collected by filtration, washed twice with 50 ml of acetone, and dried under reduced pressure for 10 hours at 80° C. to obtain 5.01 g of polymer. In this polymer, the vinyl content was 0.84/1000 carbon atoms as determined by infrared spectrophotometry. In the spectrum, absorption bands assignable to epoxy group were observed at 848 $cm^{-1}$ and 1050 to 1200 $cm^{-1}$, and the content of epoxy group was calculated to be 0.5/1000 carbon atoms. The median diameter ($d_{50}$) of produced polymer was 9.2 μm, and the Cv value was 13.5%. 100% of the particles passed through a 37-μm mesh screen. The infrared absorption spectrum after treatment with methanol completely coincided with the spectrum before treatment. The circularity coefficient of produced particles was 0.93 as determined based on the two-dimensional image.

Example 7

A nitrogen-purged 200-ml glass flask was charged with 572 mg of the epoxidized polymer obtained in Example 6 and 25 ml of Jeffamine D400 (approximate molecular weight: 400, number of PPG unit: 5 to 6, San Techno Chemicals), and the mixture was stirred at 80° C. for 10 hours. After cooling, the solid was collected by filtration, washed 3 times with 50 ml of methanol, and dried under reduced pressure at 80° C. for 10 hours to obtain 560 mg of polymer. In the infrared spectrum, absorption assignable to PPG group was strongly observed at 1050 to 1200 $cm^{-1}$, and absorption at 848 $cm^{-1}$ assignable to epoxy group had disappeared. The content of PPG group was calculated to be 0.5/1000 carbon atoms. The median diameter ($d_{50}$) of produced polymer was 9.4 μm, and the Cv value was 13.9%. 100% of the particles passed through a 37-μm mesh screen. The infrared absorption spectrum after treatment with methanol completely coincided with the spectrum before treatment. The circularity coefficient of produced particles was 0.93 as determined from the two-dimensional image.

Example 8

A nitrogen-purged 200-ml glass flask was charged with 540 mg of the epoxidized polymer obtained in Example 6, 50 ml of Jeffamine D2000 (approximate molecular weight: 2000, averaged number of PPG unit: 33, San Techno Chemicals), and 20 ml of 1,4-dioxane, and the mixture was stirred at 80° C. for 10 hours. After cooling, the solid was collected by filtration, washed 3 times with 50 ml of methanol, and dried under reduced pressure at 80° C. for 24 hours to obtain 530 mg of polymer. In the infrared spectrum, absorption assignable to PPG group was strongly observed at 1050 to 1200 $cm^{-1}$, and absorption at 848 $cm^{-1}$ assignable to epoxy group had disappeared. The content of PPG group was calculated to be 0.5/1000 carbon atoms. The median diameter ($d_{50}$) of produced polymer was 9.3 μm, and the Cv value was 13.7%. 100% of the particles passed through a 37-μm mesh screen. The infrared absorption spectrum after treatment with methanol completely coincided with the spectrum before treatment. The circularity coefficient of produced particles was 0.93 as determined from the two-dimensional image.

Example 9

A nitrogen-purged 200-ml glass flask was charged with 1.09 g of the epoxidized polymer obtained in Example 6, 42 g of Jeffamine M-1000 (approximate molecular weight: 1000, PO/EO ratio: 3/19, San Techno Chemicals), and 20 ml of 1,4-dioxane, and the mixture was stirred at 80° C. for 22 hours. After cooling, the solid was collected by filtration, washed 3 times with 50 ml of methanol, and dried under reduced pressure at 80° C. for 24 hours to obtain 1.00 g of polymer. In the infrared spectrum, absorption assignable to PEG/PPG group was strongly observed at 1050 to 1200 $cm^{-1}$, and absorption at 848 $cm^{-1}$ assignable to epoxy group had disappeared. The content of PEG/PPG group was calculated to be 0.5/1000 carbon atoms. The median diameter ($d_{50}$) of produced polymer was 9.5 μm, and the Cv value was 13.6%. 100% of the particles passed through a 37-μm mesh screen. The infrared absorption spectrum after treatment with methanol completely coincided with the spectrum before treatment.

The circularity coefficient of produced particles was 0.93 as determined from the two-dimensional image.

Example 10

A nitrogen-purged 200-ml glass flask was charged with 1.05 g of the epoxidized polymer obtained in Example 6, 50 ml of Jeffamine M-2070 (approximate molecular weight: 2000, PO/EO ratio: 10/32, San Techno Chemicals), and 30 ml of 1,4-dioxane, and the mixture was stirred at 80° C. for 30 hours. After cooling, the solid was collected by filtration, washed 3 times with 50 ml of methanol, and dried under reduced pressure at 80° C. for 24 hours to obtain 0.93 g of polymer. In the infrared spectrum, absorption assignable to PEG/PPG group was strongly observed at 1050 to 1200 cm$^{-1}$, and absorption at 848 cm$^{-1}$ assignable to epoxy group had disappeared. The content of PEG/PPG group was calculated to be 0.5/1000 carbon atoms. The median diameter ($d_{50}$) of produced polymer was 9.4 µm, and the Cv value was 13.7%. 100% of the particles passed through a 37-µm mesh screen. The infrared absorption spectrum after treatment with methanol completely coincided with the spectrum before treatment. The circularity coefficient of produced particles was 0.93 as determined from the two-dimensional image.

Example 11

To a fully nitrogen-purged stainless steel autoclave with inner volume of 1000 ml, 500 ml of heptane was charged, and 100 l/hr of ethylene was flowed therein at room temperature for 15 minutes to saturate the liquid and gas phases. After raising the temperature to 50° C., under 12 l/hr of ethylene stream, here were added 4.0 ml of decane solution of triethylaluminum (0.5 mmol/ml in terms of Al atom) and 8.0 ml (0.001 mmol of terms of Zr atom) of solid catalyst component (B1-1-A2-60), and the resultant mixture was stirred for 3 minutes with the temperature maintained. The pressure of ethylene was started increasing and raised to 0.8 MPaG over 10 minutes while the temperature was kept at 50° C. Polymerization was conducted for 1 hour supplying ethylene so as to maintain the pressure at 0.8 MPaG. Then, the autoclave was cooled and ethylene pressure was released. The resultant polymer slurry was filtered under nitrogen atmosphere, and the solid was washed twice with 100 ml of hexane and transferred to a nitrogen-purged glass reactor with inner volume of 500 ml. Here was added 200 ml of n-decane, and while the temperature was maintained at 40° C., dried oxygen was flowed therein in 15 l/hr for 1 hour. After reaction, the reaction mixture was poured into 2 l of methanol to which 10 ml of HCl had been added, stirred, and filtered. The solid collected was washed with methanol and dried under reduced pressure at 80° C. for 10 hours to obtain 12.54 g of polymer. The content of OH group in the microparticles was 0.5/1000 carbon atoms as determined by $^{13}$C-NMR. The intrinsic viscosity [η] was 2.58 dl/g. The median diameter ($d_{50}$) was 16.0 µm, and the Cv value was 14.0%. 100% of the particles passed through a 37-µm mesh screen. The infrared absorption spectrum after treatment with methanol completely coincided with the spectrum before treatment. The circularity coefficient of produced particles was 0.91 as determined from the two-dimensional image.

Example 12

To a fully nitrogen-purged SUS autoclave with inner volume of 1 l, 500 ml of purified heptane was charged, and 100 l/hr of ethylene was flowed therein at room temperature for 15 minutes to saturate the liquid and gas phases. After raising the temperature to 48° C., there were added, under 12 l/hr of ethylene stream, 0.625 ml of decane solution of triethylaluminum (1.0 mmol/ml in terms of Al atom) and 7.50 ml of solid catalyst component (B1-2-A2-126) (0.00075 mmol in terms of Zr atom), and the mixture was stirred for 3 minutes while the temperature was maintained. Immediately after 40 mg of Emulgen E-108 (Kao Corp.) was added, the pressure of ethylene was started increasing and raised to 0.8 MPaG over 10 minutes, and polymerization was performed at 50° C. for 1 hour supplying ethylene so as to maintain the pressure at 0.8 MPaG. Then, the autoclave was cooled and ethylene pressure was released. The resultant polymer slurry was filtered, and the solid was washed with hexane and dried under reduced pressure at 80° C. for 10 hours to obtain 10.49 g of polymer. In the polyethylene obtained, the vinyl content was 1.44/1000 carbon atoms as determined by infrared spectrophotometry, and the intrinsic viscosity [η] was 1.68 dl/g. Preliminary observation of the particle size of produced polymer on a microscope (Keyence Corp.) indicated the average particle diameter was 6.3 µm. The median diameter ($d_{50}$) was 6.8 µm, and the Cv value was 14.2%. 100% of the particles passed through a 37-µm mesh screen. The circularity coefficient of produced particles was 0.91 as determined from the two-dimensional image.

Example 13

To a fully nitrogen-purged SUS autoclave with inner volume of 1 l, 500 ml of purified heptane was charged, and 100 l/h of ethylene was flowed therein at room temperature for 15 minutes to saturate the liquid and gas phases. Then, after raising the temperature to 63° C., here were added, under 12 l/h of ethylene stream, 1.25 ml of decane solution of triethylaluminum (1.0 mmol/ml in terms of Al atom) and 5.33 ml (0.00008 mmol in terms of Zr atom) of solid catalyst component (B1-2-A2-172), and the mixture was stirred for 3 minutes with the temperature maintained. Immediately after 40 mg of Emulgen E-108 (Kao Corp.) was added, the pressure of ethylene was started increasing and raised to 0.8 MPaG over 10 minutes, and polymerization was performed at 65° C. for 2 hours supplying ethylene so as to maintain the pressure at 0.8 MPaG. Then, the autoclave was cooled and ethylene pressure was released. The resultant polymer slurry was filtered, and the solid was washed with hexane and dried under reduced pressure at 80° C. for 10 hours to obtain 51.87 g of polymer. In the obtained polyethylene, the vinyl content was 0.03/1000 carbon atoms as determined by infrared spectrophotometry. The intrinsic viscosity [η] was 21.0 dl/g. Preliminary observation of the particle size of produced polymer on a microscope (Keyence Corp.) indicated the average particle diameter was 8.8 µm. The median diameter ($d_{50}$) was 9.5 µm, and the Cv value was 12.0%. 100% of the particles passed through a 37-µm mesh screen. The circularity coefficient of produced particles was 0.93 as determined from the two-dimensional image.

Example 14

On a SUS-made circular pan, 3.0 g of the polymer obtained in Example 3 was distributed and exposed to UV for 50 minutes in a UV-ozonizer. After the reaction, the infrared spectrum showed absorption assignable to carbonyl group at 1680 to 1740 cm$^{-1}$. The median diameter ($d_{50}$) of produced polymer was 12.1 µm, and the Cv value was 13.7%. 100% of the particles passed through a 37-µm mesh screen. The infrared absorption spectrum after treatment with methanol completely coincided with the spectrum before treatment. The circularity coefficient of produced particles was 0.93 as determined from the two-dimensional image.

Example 15

Figure 2:
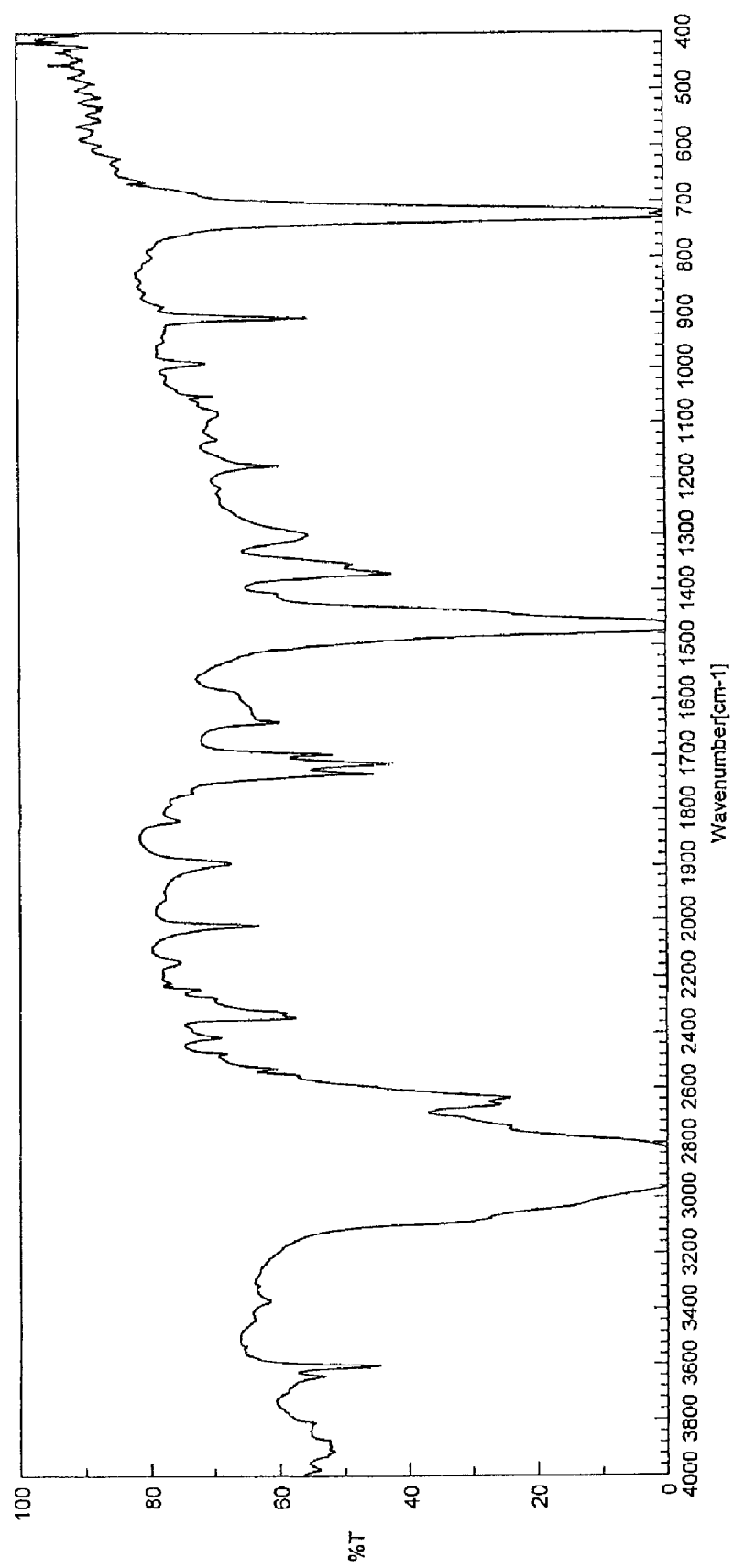
FIG. 2 is IR chart after UV irradiation of the vinyl group-containing ethylene-based polymer microparticles obtained in Example 15.

On a SUS-made circular pan, 3.0 g of the polymer obtained in Example 2 was distributed, and exposed to UV for 50 minutes in a UV-ozonizer. After the reaction, from IR chart of the polymer (FIG. 2) measured with infrared spectrophotometry, the vinyl content was 0.71/1000 carbon atoms, and absorption assignable to carbonyl group was observed at 1680 to 1740 cm$^{-1}$. The median diameter ($d_{50}$) of produced polymer was 9.2 µm, and the Cv value was 13.6%. 100% of the particles passed through a 37-µm mesh screen. The infrared absorption spectrum after treatment with methanol completely coincided with the spectrum before treatment. The circularity coefficient of produced particles was 0.94 as determined from the two-dimensional image.

Example 16

To a fully nitrogen-purged stainless steel autoclave with inner volume of 1000 ml, 500 ml heptane was charged, and 100 l/h of ethylene was flowed therein at room temperature for 15 minutes to saturate the liquid and gas phases. Then, after raising the temperature to 50° C., under 12 l/h of ethylene stream, there were added 4.0 ml of decane solution of trimethylaluminum (0.5 mmol/ml in terms of Al atom) and 7.41 ml (0.001 mmol in terms of Zr atom) of solid catalyst component (B1-1-TP$^{MS}$Zr(IV)Cl$_3$), and the mixture was stirred for 3 minutes with the temperature maintained. The pressure of ethylene was started increasing and raised to 0.8 MPaG over 10 minutes while the temperature was kept at 50° C., and polymerization was performed for 1 hour supplying ethylene so as to maintain the pressure at 0.8 MPaG. Then, the autoclave was cooled and ethylene pressure was released. The resultant polymer slurry was filtered under nitrogen atmosphere, and the solid was washed twice with 100 ml of hexane and transferred to a nitrogen-purged 500-ml glass reactor. Here was added 200 ml of n-decane, and while the temperature was maintained at 40° C., dried oxygen was flowed therein in 15 l/hr for 1 hour. After reaction, the reaction mixture was poured into 2 l of methanol to which 10 ml of HCl had been added, stirred, and filtered. The solid was washed with methanol and dried under reduced pressure at 80° C. for 10 hours to obtain 11.54 g of polymer. In the microparticles, the OH group content was 0.4/1000 carbon atoms as determined by $^{13}$C-NMR. The intrinsic viscosity [η] was 3.02 dl/g. The median diameter ($d_{50}$) was 15.4 µm, and the Cv value was 14.4%. 100% of the particles passed through a 37-µm mesh screen. The infrared absorption spectrum after treatment with methanol completely coincided with the spectrum before treatment. The circularity coefficient of produced particles was 0.91 as determined from the two-dimensional image.

The invention claimed is:

1. Ethylene-based polymer microparticles obtained by a process comprising polymerizing ethylene alone or ethylene with at least one monomer selected from linear or branched α-olefins having 3 to 6 carbon atoms, cycloolefins, polar group-containing olefins, dienes, trienes, and aromatic vinyl compounds, in the presence of a polymerization catalyst component comprising a solid catalyst component,
wherein the solid catalyst component comprises a transition metal compound or a liquid titanium compound, which compound being supported on non-agglomerated spherical magnesium-containing microparticles,
wherein the non-agglomerated spherical magnesium-containing microparticles contain a magnesium atom, an aluminum atom, and an alkoxy group having 1 to 20 carbon atoms, wherein the non-agglomerated spherical magnesium-containing microparticles are insoluble in hydrocarbon solvents, wherein the non-agglomerated spherical magnesium-containing microparticles have a median diameter ($d_{50}$) measured by laser diffraction scattering of 0.1 µm≦$d_{50}$≦5 µm, and a variation coefficient of particle diameter (Cv) or 20% or less, and
wherein the ethylene-based polymer microparticles have properties (A) to (E) below simultaneously:
(A) the intrinsic viscosity [η] measured in decalin at 135° C. is in the range of 0.1 to 50 dl/g, (B) at least 95 wt % or more of particles pass through a mesh screen having an opening of 37 µm, (C) the median diameter ($d_{50}$) measured by laser diffraction scattering is 3 µm≦$d_{50}$≦25 µm, (D) the circularity coefficient is 0.85 or more, and (E) the variation coefficient of particle diameter (Cv) is 20% or less.

2. Functional group-containing ethylene-based polymer microparticles having one or more functional groups selected from the group consisting of vinyl group, vinylene group, vinylidene group, oxygen-containing group, nitrogen-containing group, boron-containing group, sulfur-containing group, phosphorus-containing group, silicon-containing group, germanium-containing group, halogen-containing group, and tin-containing group, wherein (B) at least 95 wt % or more of particles pass through a mesh screen having an opening of 37 µm, (C) the median diameter ($d_{50}$) measured by laser diffraction scattering is 3 µm≦$d_{50}$≦25 µm, (E) the variation coefficient of particle diameter (Cv) is 20% or less, and (F) the infrared absorption spectrum after treatment with methanol is substantially the same as infrared absorption spectrum before treatment with methanol.

3. The functional group-containing ethylene-based polymer microparticles according to claim 2, wherein the number of functional groups is 0.01 to 20 per 1000 carbon atoms of the constitutional particles.

4. The functional group-containing ethylene-based polymer microparticles according to claim 2 or 3, which comprise 90 to 100 mol % of constitutional unit derived from ethylene and 0 to 10 mol % of constitutional unit derived from one or more monomers selected from the group consisting of linear or branched α-olefins having 3 to 6 carbon atoms, cycloolefins, polar group-containing olefins, dienes, trienes, and aromatic vinyl compounds.

5. A molded article obtained by molding the ethylene-based polymer microparticles or functional group-containing ethylene-based polymer microparticles according to claim 1 or 2.

6. A sintered body formed from the ethylene-based polymer microparticles or functional group-containing ethylene-based polymer microparticles according to claim 1 or 2.

* * * * *